US011144382B2

(12) United States Patent
Justin et al.

(10) Patent No.: US 11,144,382 B2
(45) Date of Patent: *Oct. 12, 2021

(54) PROFILING AND DIAGNOSTICS FOR INTERNET OF THINGS

(71) Applicant: INTEL CORPORATION, Santa Clara, CA (US)

(72) Inventors: Jerin C Justin, San Jose, CA (US); Kumar Balasubramanian, Chandler, AZ (US); Naveen Manicka, San Jose, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/708,332

(22) Filed: Dec. 9, 2019

(65) Prior Publication Data

US 2020/0183774 A1 Jun. 11, 2020

Related U.S. Application Data

(63) Continuation of application No. 15/638,616, filed on Jun. 30, 2017, now Pat. No. 10,503,581.

(60) Provisional application No. 62/379,347, filed on Aug. 25, 2016.

(51) Int. Cl.
*G06F 11/00* (2006.01)
*G06F 11/07* (2006.01)

(52) U.S. Cl.
CPC ...... *G06F 11/0793* (2013.01); *G06F 11/0709* (2013.01); *G06F 11/079* (2013.01); *G06F 11/0751* (2013.01); *G06F 11/0787* (2013.01)

(58) Field of Classification Search
CPC ............ G06F 11/0793; G06F 11/0709; G06F 11/0751; G06F 11/0787; G06F 11/079; G06F 11/261
See application file for complete search history.

(56) References Cited

U.S. PATENT DOCUMENTS

| | | |
|---|---|---|
| 8,005,860 B1 | 8/2011 | Nadel et al. |
| 9,021,310 B1 | 4/2015 | McCabe et al. |
| 10,101,244 B2 | 10/2018 | Mankovskii et al. |
| 10,503,581 B2 | 12/2019 | Justin et al. |
| 2012/0192016 A1 | 7/2012 | Gotesdyner et al. |
| 2015/0052122 A1 | 2/2015 | Landry et al. |
| 2015/0195296 A1 | 7/2015 | Vasseur et al. |
| 2016/0258845 A1 | 9/2016 | Mankovskii et al. |
| 2016/0322120 A1 | 11/2016 | Burke et al. |
| 2017/0011298 A1 | 1/2017 | Pal et al. |

(Continued)

FOREIGN PATENT DOCUMENTS

WO 2018038896 3/2018

OTHER PUBLICATIONS

"International Application Serial No. PCT US2017 045520, Written Opinion dated Nov. 15, 2017", 10 pgs.

(Continued)

*Primary Examiner* — Joseph D Manoskey
(74) *Attorney, Agent, or Firm* — Schwegman Lundberg & Woessner, P.A.

(57) ABSTRACT

A computing device and method for profiling and diagnostics in an Internet of Things (IoT) system, including matching an observed solution characteristic of the IoT system to an anomaly in an anomaly database.

34 Claims, 13 Drawing Sheets

(56) References Cited

U.S. PATENT DOCUMENTS

| | | |
|---|---|---|
| 2017/0102978 A1 | 4/2017 | Pallath et al. |
| 2017/0372212 A1 | 12/2017 | Zasadzinski et al. |
| 2018/0060159 A1 | 3/2018 | Justin et al. |
| 2018/0219889 A1* | 8/2018 | Oliner ..................... G06N 3/08 |
| 2018/0359597 A1* | 12/2018 | Lazar ................. H04L 41/0813 |

OTHER PUBLICATIONS

"International Application Serial No. PCT US2017 045520, International Preliminary Report on Patentability dated Mar. 7, 2019", 12 pgs.
"U.S. Appl. No. 15/638,616, Non Final Office Action dated Feb. 6, 2019", 15 pgs.
"U.S. Appl. No. 15/638,616, Response filed May 6, 2020 to Non Final Office Action dated Feb. 6, 2019", 13 pgs.
"U.S. Appl. No. 15/638,616, Notice of Allowance dated Jul. 22, 2019", 8 pgs.
PCT International Search Report, PCT Application No. PCT/US2017/045520, dated Nov. 15, 2017, 3 pages.

* cited by examiner

300

800A

PROFILING AND DIAGNOSTICS FOR INTERNET OF THINGS

CROSS REFERENCE TO RELATED APPLICATIONS

This application is a continuation application and claims the benefit of the filing date of U.S. patent application Ser. No. 15/638,616 filed on Jun. 30, 2017 and issued as U.S. Pat. No. 10,503,581, the contents of which are incorporated by reference as if set forth in their entirety herein. U.S. patent application Ser. No. 15/638,616 claimed the benefit of the filing date of U.S. Provisional Patent Application No. 62/379,347, filed on Aug. 25, 2016, and this application also claims the benefit of U.S. Provisional Patent Application No. 62/379,347, filed on Aug. 25, 2016, the contents of which are incorporated by reference as if set forth in their entirety herein.

TECHNICAL FIELD

The present techniques relate generally to Internet of Things (IoT), and more particularly, to IoT profiling and diagnostics.

BACKGROUND

One view of the internet is the connection of clients, such as personal computers, tablets, smart phones, servers, digital photo-frames, and many other types of devices to publicly-accessible data-centers hosted in server farms. However, this picture represents a small portion of the overall usage of the globally-connected network. A very large number of connected resources currently exist, but are not publicly accessible. Examples include corporate networks, private organizational control and monitoring networks spanning the globe, and peer to peer relays designed for anonymity.

The Internet of Things (IoT) may bring Internet connectivity to as many as 50 billion devices by 2020. For organizations, IoT devices may provide opportunities for monitoring, tracking, or controlling other devices and items, including further IoT devices, other home and industrial devices, items in manufacturing and food production chains, and the like. Further, the emergence of IoT networks has served as a catalyst for profound change in the evolution of the internet. In the future, the internet is likely to evolve from a primarily human-oriented utility to an infrastructure where humans may eventually be minority actors in an interconnected world of devices.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Embodiments of the present techniques may include a computing device for profiling and diagnostics in an Internet of Things (IoT) system. The computing device may generate and store an anomaly database for the IoT system. For example, the anomaly database may be generated offline and via a simulation or model. In some embodiments, generating the anomaly database may include the computing device performing a simulation to iterate through workloads or applications on the IoT system at different conditions or configurations of gateway architecture characteristics of the IoT system, giving resulting simulated solution characteristics of the IoT system. Thus, if the observed simulated solution characteristic and associated gateway characteristic indicate an anomaly for a given workload, then that simulated solution characteristic may be added to the anomaly database as an anomaly. The gateway architecture characteristics considered may be existing, prophetic, or proposed. Moreover, the term "solution" as used in this context may mean an observed result of a workload on a given architecture.

Figure 2:
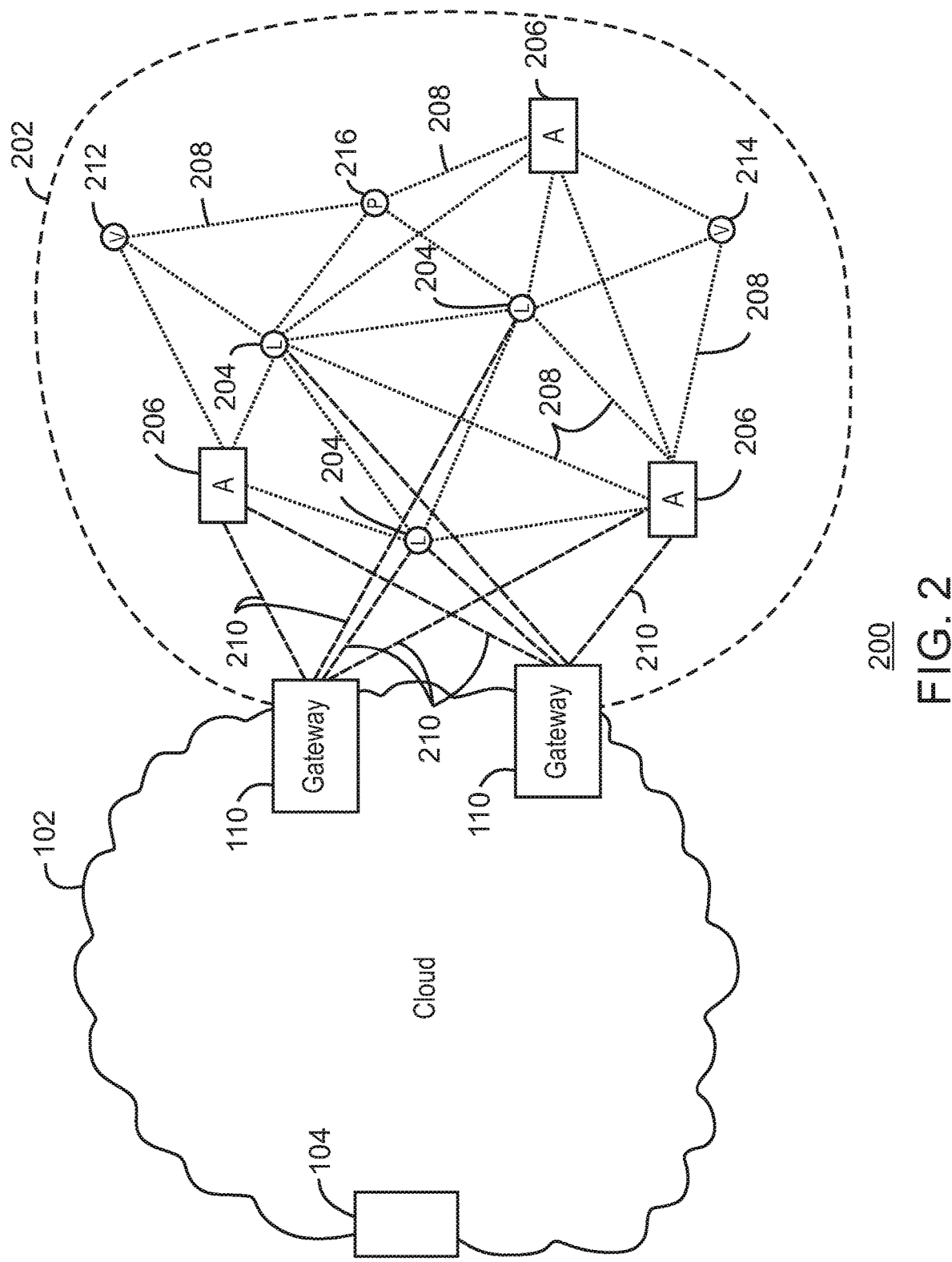
FIG. 2 is a drawing of a cloud computing network, or cloud, in communication with a mesh network of IoT devices, which may be termed a fog device, operating at the edge of the cloud in accordance with embodiments of the present techniques.
Figure 3:
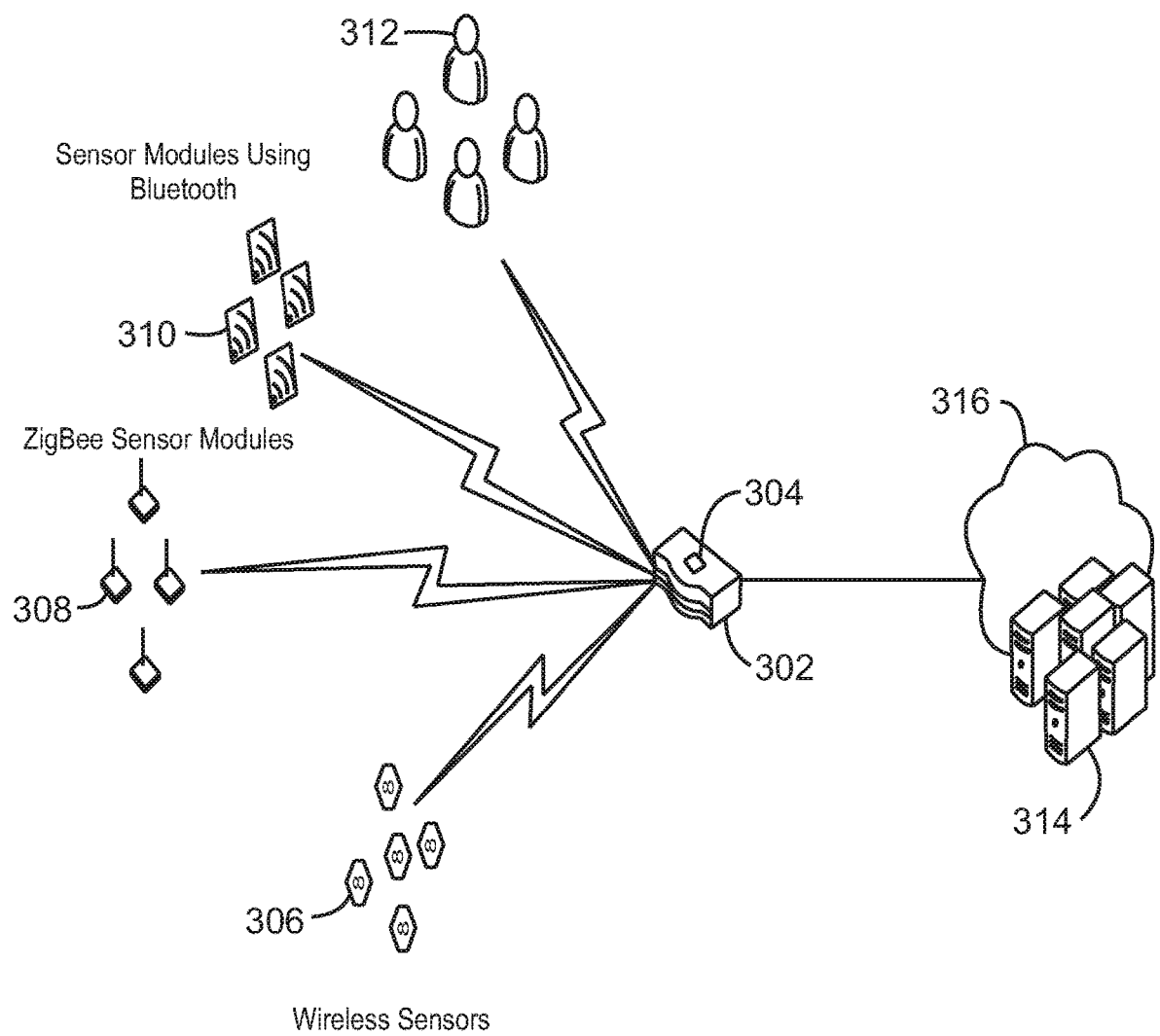
FIG. 3 is a schematic diagram of an end-to-end IoT implementation system in accordance with embodiments of the present techniques.
Figure 7:
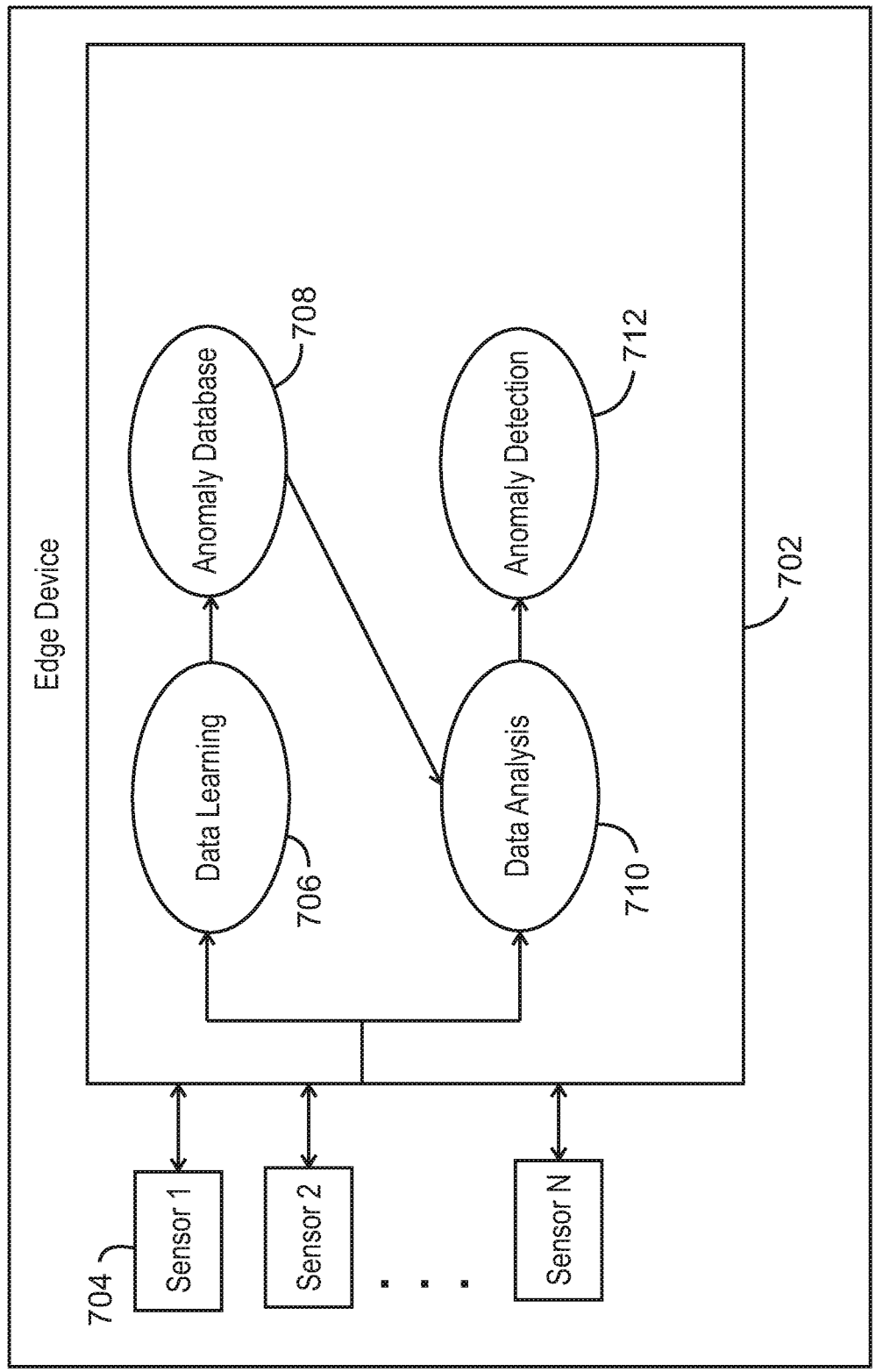
FIG. 7 is a system diagram depicting data flow for creating the anomaly database and for anomaly detection using that database in accordance with embodiments of the present techniques.

In some examples, the computing device is an aggregation device of the IoT system, such as the fog device described with respect to FIG. 2, the aggregation device 302 of FIG. 3, or the edge device 702 of FIG. 7. However, a computing device to build the anomaly database via a simulation may be a computing device remote from the IoT system or a cloud server, and the like, whereas a computing device to implement or use the anomaly database online to identify anomalies in real time may be the aggregation device or other device in the IoT system. Multiple different configurations are applicable.

In general, the IoT system may include an aggregation device and sensors wirelessly coupled to the aggregation device. In real time operation of the IoT system, the computing device may match an observed real solution characteristic of the IoT system to an anomaly in the anomaly database, and issue a notification of the match. Further, the computing device may facilitate implementing corrective action in response to the notification of the match. In some examples, the corrective action may prevent a failure, or reduce the likelihood of a failure, in the IoT system associated with the anomaly. Thus, embodiments may be directed to an On-Device IoT Profiler and Smart Diagnostics Engine applied to root-cause behavioral excursions of an IoT architecture. Some examples relate to the field of data traffic profiling, in particular, to IoT end points and their associated aggregate devices for identification and preemptively preventing or reducing occurrence of an error or failed condition.

IoT systems may include an interconnected array of sensors and actuators which may be problematic if compromised. Traditional diagnosis systems generally include static rule-based engines that may not be sufficiently dynamic or robust to respond to ongoing threats. The present technique may facilitate analysis in real time of relevant input sequences, generate risk analysis-based modelling files, and predict correlation to potential fatal or anomalous solution characteristics. Thus, fatal circumstances and anomalies may be prevented or their occurrence reduced.

Captured temporal states of input events and triggers aid in offline replay and analysis. Implementations of IoT diagnostic solutions may be based on analysis of workflow input parameters at an aggregation point, as discussed below. However, after-the-fact reactive event monitoring may be unreliable for system administrators to to predict and prevent impending fatal system conditions. In contrast, the present techniques may provide for an on-device IoT profiler and smart diagnostics at the aggregation point that facilitate system administrators to run diagnostics based on solution profiling statistics. If the monitored current conditions trend to an end goal of security threats and rogue processes, such as a denial of service attack, the threat or rogue process in some examples may be detected and acted upon before fatal conditions occur and hence reduce the possibility for a breach.

The on-device IoT profiler and smart diagnostics may predict and detect anomaly conditions based on extrapolation of current conditions by constantly or substantially constantly performing related lookups to the solution characteristics database. Described herein are examples of profiling and diagnostics at or by the aggregation point that may proactively detect and prevent or reduce the likelihood of fatal conditions in the IoT system from occurring. In certain examples, the profiling and diagnostic processes can be extended from the aggregation device to function on edge sensor modules, sensor hubs, and on data servers within the cloud, and so forth. Moreover, the sensor hubs, sensors, and gateway may be real, virtual, or simulated.

A mapping table that correlates observed solution characteristics triggered by rogue input parameters may be registered within the target compute system. Workflow events may be analyzed for trending correlations to the estimated rogue solution characteristics for relatively strong associations. Some of the outlined embodiments describe the lookup and trending processes between the sensor events and the anomaly solution characteristics as exhibited by the target application. Lastly, an anomaly may be a deterioration including by a compromised or rogue attack, such as a denial of service (DOS) attack, an equipment failure or maintenance mishap or failure unrelated to a rogue attack, an operating overload in the IoT system, and so on.

Figure 1:
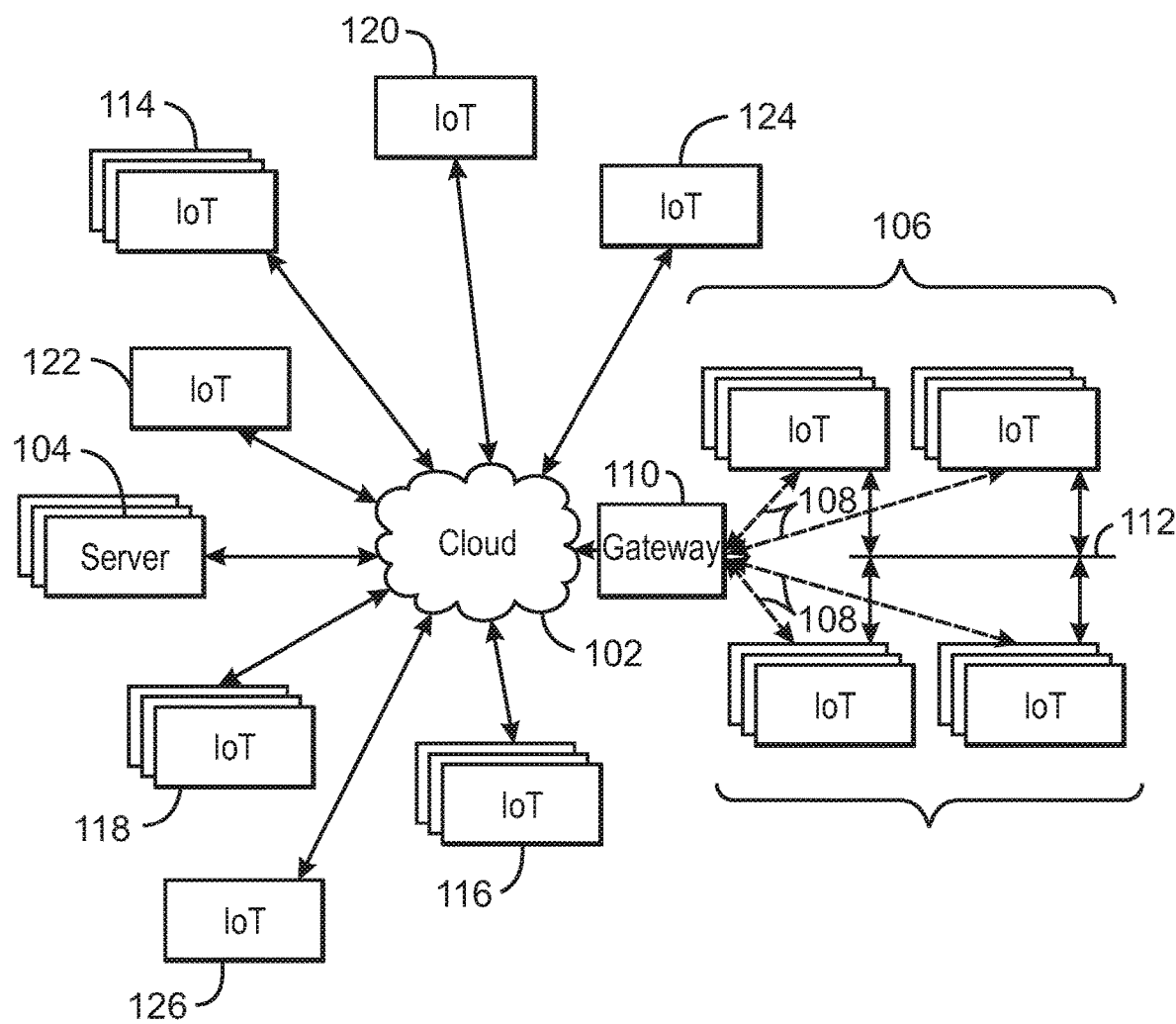
FIG. 1 is a drawing of a cloud computing network, or cloud, in communication with a number of Internet of Things (IoT) devices in accordance with embodiments of the present techniques.

FIG. 1 is a drawing of a cloud computing network, or cloud 102, in communication with a number of Internet of Things (IoT) devices. The cloud 102 may represent the Internet, or may be a local area network (LAN) or wide area network (WAN) such as a proprietary network for a company. The cloud 102 may be in contact with one or more servers 104 that may provide command and control functions or consume data from the IoT devices. The IoT devices may include different types of devices, grouped in various combinations. For example, a traffic control group 106 may include IoT devices along streets in a city. These IoT devices may include stoplights, traffic flow monitors, cameras, weather sensors, and the like. The traffic control group 106, or other subgroups, may be in communication with the cloud 102 through wireless links 108, such as low-power wide area (LPWA) links, and so forth. Further, a wired or wireless sub-network 112 may allow the IoT devices to communicate with each other, such as through a local area network, wireless local area network, and the like. The IoT devices may use another device, such as a gateway 110, which may function as an aggregator or aggregation device, to communicate with the cloud 102. In some examples, the sub-network 112 may couple one or more of the IoT devices to the gateway 110 using a wired network.

Moreover, the IoT devices may also use one or more servers (not shown) operationally disposed along the gateway 110, or between the group 106 and the gateway 110, to facilitate communication of the group 106 with the cloud 102 or with the gateway 110. For example, the one or more servers may operate as an intermediate network node to support a local edge cloud or fog implementation among a local area network. Moreover, in profiling and diagnostics, the gateway 110 and the one or more servers may be real, virtual, or simulated.

The network topology may include various types of IoT networks, such as a mesh network via Bluetooth® low energy (BLE) links. Other types of IoT networks may include a wireless local area network (WLAN) network to communicate with IoT devices through IEEE 802.11 (Wi-Fi®) links, a cellular network to communicate with IoT devices through an LTE/LTE-A (4G) or 5G cellular network, and a LPWA network. A LPWA network may be compatible with the long range wide area network (LoRaWAN™) specification promulgated by the LoRa alliance. The network topology or IoT network(s) may include IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) via a variety of communications links, such as an LTE cellular link, an LPWA link, or a link based on the IEEE 802.15.4 standard, such as Zigbee®, and so on. The respective IoT networks may also operate by network and internet application protocols such as Constrained Application Protocol (CoAP). The respective IoT networks may also be integrated with coordinator devices that provide a chain of links that forms cluster tree of linked devices and networks.

Although wireless networks and wired networks are described, such as LPWA links, optical links, and the like, it may be noted that any type of network may be used to couple the devices to each other or to a gateway 110. A network or assembled group of devices may have both wired and wireless connections, and may use both simultaneously between nodes, peers, and gateway devices. Further the network or assembled group of devices may use wired networks, wireless networks, or both, to communicate with the cloud, and any higher performance computing devices that may be participating to deliver services or support to what is disclosed herein. Thus, any link 108 or network 112 may utilize a wired connection or a wireless connection. Further, IoT devices may be in direct communications with other devices in the cloud 102 without the use of a gateway 110. The backbone links 108 may include various wired or wireless technologies, including optical networks and, again, may be part of a LAN, a WAN, or the Internet. Additionally, such communication links facilitate optical signal paths among both IoT devices with the cloud 102 and the gateway(s) 110, including the use of MUXing/deMUXing components that facilitate interconnection of the various devices.

IoT devices may include temperature sensors 114, remote weather stations 116, alarm systems 118, automated teller machines 120, alarm panels 122, or moving vehicles, such as emergency vehicles 124 or drones 126, among many others. Each of these IoT devices may be in communication with other IoT devices, with servers 104, or both. Moreover, in profiling and diagnostics, the servers 104 and the various IoT devices may be real, virtual, or simulated.

As can be seen from FIG. 1, a relatively large number of IoT devices may be communicating through the cloud 102. This may facilitate different IoT devices to request or provide information to other devices autonomously. For example, the traffic control group 106 may request a current weather forecast from a group of remote weather stations 116, which may provide the forecast without human intervention. Further, an emergency vehicle 124 may be alerted by an automated teller machine 120 that a burglary is in progress. As the emergency vehicle 124 proceeds towards the automated teller machine 120, the vehicle 124 may access the traffic control group 106 to request clearance to the location. For example, the clearance may be by turning lights to red to block cross traffic at an intersection in sufficient time for the emergency vehicle 124 to have unimpeded access to the intersection.

Clusters of IoT devices, such as the remote weather stations 116 or the traffic control group 106, may be equipped to communicate with other IoT devices as well as with the cloud 102. This may facilitate the IoT devices to form an ad-hoc network or virtual network between the devices, allowing them to function as a single device, which may be termed a fog device. This is discussed further with respect to FIG. 2. Furthermore, components shown in FIG. 1, such as the gateway and various sensors or servers, may be real, virtual, or simulated. Indeed, the representations in FIG. 1 may be real or simulated with respect to their depiction and in evaluation, including in any hybrid operation of the live real IoT components with simulated or emulated components.

FIG. 2 is a drawing 200 of a cloud computing network, or cloud 102, in communication with a mesh network of IoT devices, which may be termed a fog device 202, operating at the edge of the cloud 102. Like numbered items are as described with respect to FIG. 1. As used herein, a fog device 202 is a cluster of devices that may be grouped to perform a specific function, such as traffic control, weather control, plant control, home monitoring, and the like.

Although the fog device 202 is shown as a mesh network in this example, using gateways 110 to communicate with devices in the cloud 102, the devices do not have to be part of a mesh network, or even proximate to each other to form a fog device. Thus, the devices do not have to be in direct radio or network communications with each other, or proximate to each other, but may form an ad hoc group based on function. The formation of the fog device 202 may be as simple as sharing naming, type, and identification information, for example, group identity credentials, between the different devices forming the fog device. This may allow any device to act as a representative of the fog device 202, with providing identity specific to the device. As an example, although the fog device 202 is this example is shown as being made up of devices in a single location, fog devices can include devices in multiple locations, formed to provide specific services. For example, the fog device 202 may include remote weather stations located in the cloud 102. Further, a server 104 located in a data center may be included in the fog device 102 for data analysis, and other services.

In this example, the fog device 202 is a group of IoT devices at an intersection. The fog device 202 may be established in accordance with specifications released by the OpenFog Consortium (OFC), among others. These specifications allow the formation of a hierarchy of computing elements between the gateways 110 coupling the fog device 202 to the cloud 102 and endpoint devices, such as the traffic lights 204 and the data aggregators 206 in this example. The fog device 202 can leverage the combined processing and network resources that the collective of IoT devices provides. Moreover, the server 104, IoT devices generally and end-point devices, may be real, virtual, or simulated.

Traffic flow through the intersection may be controlled by a plurality of traffic lights 204 (e.g., three traffic lights 204). Analysis of the traffic flow and control schemes may be implemented by aggregators 206 that are in communication with the traffic lights 204 and each other through a mesh network. Data may be uploaded to the cloud 102, and commands may be received from the cloud 102, through gateways 110 that are in communication with the traffic lights 204 and the aggregators 206 through the mesh network.

Various communications links may be employed in the fog device 202. Shorter-range links 208, for example, compatible with IEEE 802.15.4 may provide local communications between IoT devices that are proximate to the intersection. Longer-range links 210, for example, compatible with LPWA standards, may provide communications between the IoT devices and the gateways 110. To simplify the diagram, not every communications link 208 or 210 is labeled with a reference number. Further, not every device that participates in the fog device 202 needs to be located proximate to the other devices or in direct radio communications. For example, the fog device 202 may incorporate a weather station located on a different network.

One or more of the communications links 208 and 210 may be replaced with a wired connection between two devices. The network forming the fog device 202 does not have to be a mesh network, but may be a standard network in which each device is coupled to other devices through a wired or wireless connection to the gateways 110.

The fog device 202 may be considered to be an interconnected network wherein a number of IoT devices are in communications with each other, for example, by the communication links 208 and 210, through the cloud 102 via a network communications link, or through a gateway 110. For devices proximate to one another, the network may be established using the open interconnect consortium (OIC) standard specification 1.0 released by the Open Connectivity Foundation™ (OCF) on Dec. 23, 2015. This standard provides for devices to discover each other and establish communications for interconnects. Other interconnection protocols may also be used, including, for example, the optimized link state routing (OLSR) Protocol, or the better approach to mobile ad-hoc networking (B.A.T.M.A.N.), among many others.

In some aspects, communications from any IoT device may be passed along the most convenient path between any of the IoT devices to reach the gateways 110, for example, the path having the fewest number of intermediate hops, or the highest bandwidth, among others. In these networks, the number of interconnections provide substantial redundancy, facilitating communications to be maintained, even with the loss of a number of IoT devices.

In some aspects, the fog device 202 can include temporary IoT devices. In other words, not all of the IoT devices may be permanent members of the fog device 202. In illustrated example, three transient IoT devices have joined the fog device 202, a first vehicle 212, a second vehicle 214, and a pedestrian 216. In these cases, the IoT device may be built into the vehicles 212 and 214, or may be an App on a cell phone carried by the pedestrian 216.

The fog device 202 of the devices may be presented to clients in the cloud 102, such as the server 104, as a single device located at the edge of the cloud 102. In this example, the control communications to specific resources in the fog device 202 may occur without identifying any specific IoT device within the fog device 202. Accordingly, if an IoT device fails, other IoT devices may be able to discover and control a resource. For example, the traffic lights 204 may be wired so as to allow any one of the traffic lights 204 to control lights for the other traffic lights 204.

In some examples, the IoT devices may be configured using an imperative programming style, e.g., with each IoT device having a specific function and communication partners. However, the IoT devices forming the fog device 202 may be configured in a declarative programming style, allowing the IoT devices to reconfigure their operations and communications, such as to determine needed resources in response to conditions, queries, and device failures. This may be performed as transient IoT devices, such as the pedestrian 216, join the fog device 202. As the pedestrian 216 is likely to travel more slowly than the vehicles 212 and 214, the fog device 202 may reconfigure itself to ensure that the pedestrian 216 has sufficient time to make it through the intersection. This may be performed by forming a temporary group of the vehicles 212 and 214 and the pedestrian 216 to control the traffic lights 204. If one or both of the vehicles 212 or 214 are autonomous, the temporary group may instruct the vehicles to slow down prior to the traffic lights 204.

As the transient devices 212, 214, and 216, leave the vicinity of the intersection the fog device 202, it may reconfigure itself to eliminate those IoT devices from the network. As other transient IoT devices approach the intersection, the fog device 202 may reconfigure itself to include those devices.

The fog device 202 may include the traffic lights 204 for a number of intersections, such as along a street, along with all of the transient IoT devices along the street. The fog device 202 may then divide itself into functional units, such as the traffic lights 204 and other IoT devices proximate to a single intersection. This type of combination may enable the formation of larger IoT constructs in the fog device 202. For example, if an emergency vehicle joins the fog device 202, an emergency construct, or virtual device, may be created that includes all of the traffic lights 204 for the street, allowing control of the traffic flow patterns for the entire street. The emergency construct may instruct the traffic lights 204 along the street to stay red for opposing traffic and green for the emergency vehicle, expediting the passage of the emergency vehicle. Lastly, while this discussion may focus on traffic examples, many other applications (unrelated to traffic) are relevant and applicable.

In general, system 200 may accommodate the combinations or congruence for profiling and diagnostics in the IoT system. An anomaly database may be applied in real time operation of the IoT system. In particular, an observed solution characteristic of the IoT system may be matched to an anomaly in the anomaly database, and a notification issued in response to the match. Further, corrective action in response to the notification of the match may be implemented. In some examples, the corrective action may prevent a failure, or reduce the likelihood of a failure, in the IoT system associated with the anomaly.

Certain embodiments provide for an IoT system to perform simulations of the IoT system itself. For instance, simulation code may be stored and executed on the fog device 202, the aggregation device 302 of FIG. 3, or on other devices in an IoT system, such as the data aggregators 206 of the fog device 202. The simulation provides for considering various simulated conditions of the IoT system. In evaluation or operation, the IoT devices of FIG. 2 may be real, virtual, or simulated.

Simulations may include different workloads on the existing IoT architecture giving resulting solution characteristics. In some examples, the simulation system disposed in the IoT system may iterate through simulated incremental values of workload values, architecture or gateway values, and observed solution characteristics values. In particular examples, the simulations may provide for reconfiguration of a fog device 202, for example, by modelling a change in which IoT devices are used to provide particular functions. In other examples, the simulations may provide for development of an anomaly database, as discussed throughout the present disclosure.

Moreover, again, an IoT simulation system may be installed and executed on an existing fog device 202, existing aggregation device 302, or on other existing devices in an existing IoT system. The installation of the IoT simulation system may allow for the creation of IoT devices that include both virtual and real IoT devices. Indeed, such may be in reference to a hybrid setup of real and simulated devices. The virtual IoT device may facilitate testing different configurations of IoT devices, for example, before adding additional IoT devices to a fog device 202 or before reconfiguring communications in a fog device 202. The test results may determine functionality, stability, and the like, as the configuration changes. Further, as discussed herein, the anomaly database developed via the simulations may be applied online to the IoT system to detect anomalies in the IoT system in real time.

Indeed, the simulations for evaluating or detecting anomalies may run and operate in an environment where both live IoT systems and the simulation/emulation are running together to consider, for example, an expansion of an IoT system by testing the proposed architecture. Thus, embodiments may include a hybrid of live and simulated/emulated systems. This hybrid set-up may accommodate opportunity to test, for example, system capacity and fault recovery scenarios.

Figure 4:
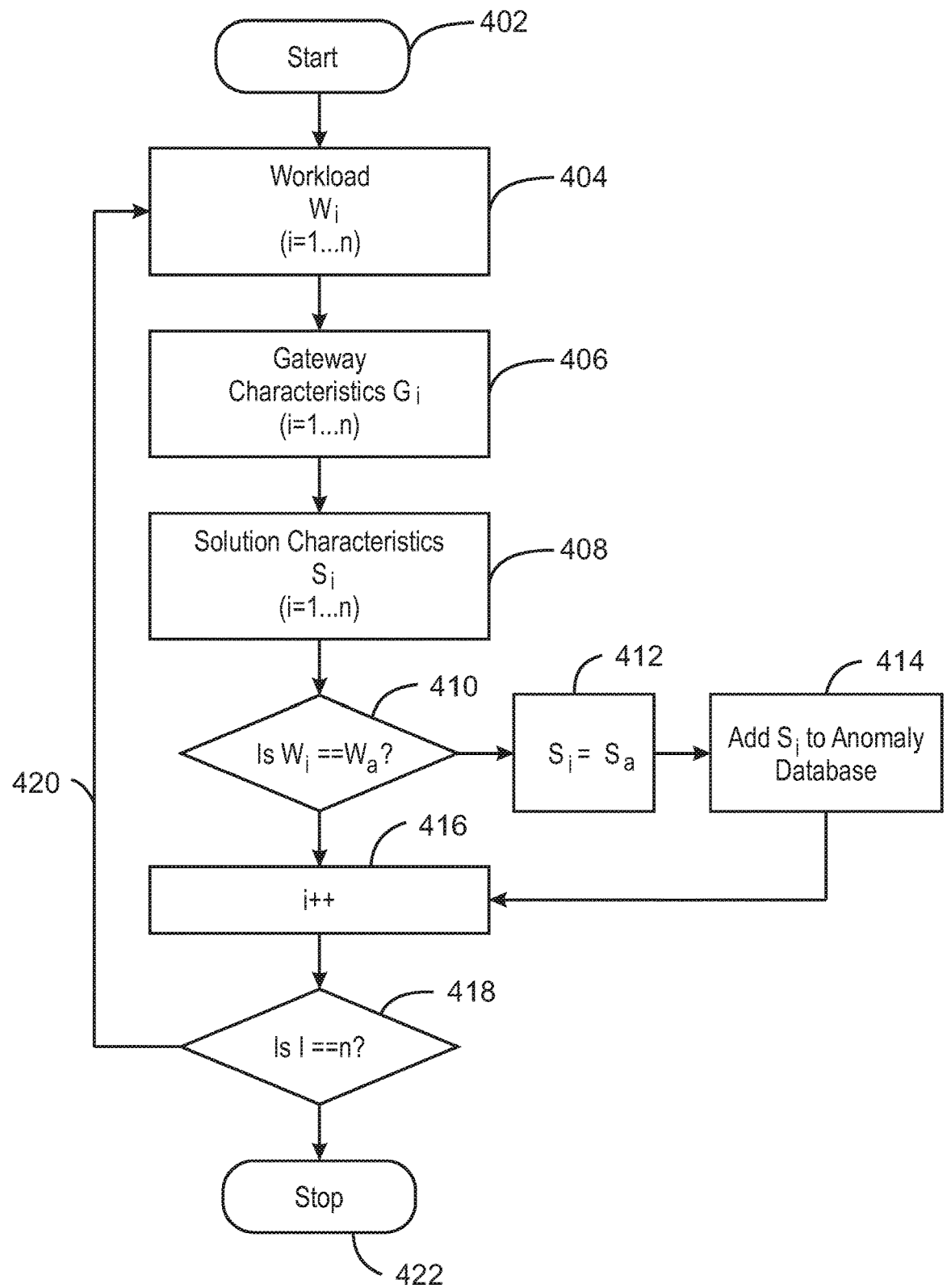
FIG. 4 is a block flow diagram of a method for identifying and building an anomaly database in accordance with embodiments of the present techniques.

FIG. 3 is a simplified diagram of an end-to-end IoT system 300. In some examples, the edge infrastructure or edge architecture may be defined herein as including the components depicted in FIG. 3 except for the cloud 316 and cloud servers 314. An aggregation device 302, e.g., aggregator, gateway, edge device, etc., may store code 304, e.g., instructions, logic, etc., executable by a processor of the aggregation device 302 (e.g., IoT device 1200 of FIG. 12) to implement techniques discussed herein. In addition to or in lieu of the aggregation device 302 implementing profiling and diagnostics, the code 304 may be stored and executed on other devices such as the servers 316, a computing device (e.g., FIG. 8) of a design engineer or service technician, IoT sensor devices 306, 308, 310 or sensor modules, IoT devices generally, and the like. Indeed, in some embodiments, the database discussed below with respect to FIG. 4 is developed or built on a computing device (e.g., 800 of FIG. 8) which may be in or remote to the IoT system 300, and so forth. The database and compliance techniques as described with respect to FIGS. 5 and 6 may be applied and executed via the aggregation device 302, other IoT device, computing device coupled to the IoT system, a remote computing device, and so forth.

In the illustrated embodiment of FIG. 3, wireless sensors 306 are communicatively coupled to the aggregation device 302 via a wireless connection. The wireless connection may be Wi-Fi Direct™ or via an access point router, or other wireless communication protocols The ZigBee® sensor modules 308 are wirelessly coupled to the aggregation device via ZigBee®. ZigBee® is a wireless language that devices including everyday devices may employ to connect to one another, such as in the home, workplace, business, government entity, or public domain. The sensors 310 configured to employ Bluetooth® are coupled to the aggregation device 302 via Bluetooth®, Bluetooth® Low Energy (BLE), and the like. Further, network administrators or end-user devices 312 may be coupled to the aggregation device 302 via various protocols such as hypertext transfer protocol (HTTP), secure shell (SSH)/Telnet, simple network management protocol (SNMP), health monitoring pings, and so forth. Lastly, the aggregation device 302 may function as a gateway or interface between the sensors with servers 314 and other devices in a cloud 316. Various configurations are applicable, including configurations of the aggregation device 302 as the gateways 110 of FIG. 2, the data aggregators 206 of FIG. 2, or both the gateways 110 and aggregators 206.

In operation, workflow parameters are received or input to the aggregation device 302 or remote computing device, such as by the servers 314, network administrators or end-users 312, sensors 306, 308, 310, or other entities. Examples of input workflow parameters include publish frequency, burst size, data size, total number of sensors, and so on. Solution characteristics, which may be in relation to the input workflow parameters, are output from the aggregation device 302. Examples of output solution characteristics may include sensor registration delay, CPU utilization, memory degradation impact, latency limits, and the like. Solution characteristics are observed characteristics or observed resulting characteristics including numerical values. Embodiments may include combining workflow parameters and simulated or real solution characteristics to produce output solution or observed characteristics. In other words, some embodiments may not refer to simulated endpoints in addition to the real devices. Indeed, the aggregation device 302, IoT sensors 306, 308, 310, and servers 314 may be real, virtual, or simulated.

The edge infrastructure represented by FIG. 3 may include the following three components: a control user interface (UI), an automation framework, and an IoT database including an anomaly database as discussed below. The control UI facilitates access to configuration parameters such as the number of sensors, sensor publish frequencies, packet sizes, burstiness of the traffic profiles, quality of service (QoS) values of Message Queuing Telemetry Transport (MQTT) based transmissions, and the like. Burstiness may refer to a sudden increase in traffic rates. For instance, a 60 second traffic profile may include 5 seconds of line rate traffic and 55 seconds of 10% bandwidth utilization. The control UI may have the ability to dynamically modify runtime parameters, a characteristic that gives the edge infrastructure the ability to represent real world scenarios. The control UI may initiate monitoring daemons in devices controlled via the UI, such as in sensor hubs, sensors, gateways, cloud servers, etc. As appreciated by the skilled artisan, a daemon may be a computer program that runs as a background process, rather than being under the direct control of an interactive user. Moreover, again, the sensor hubs, sensors, gateways, and servers may be real, virtual, or simulated.

As for the automation framework, the edge infrastructure may provide application program interfaces (APIs) for canned trigger scripts to interact. The modular nature of this automation framework may allow for seamless integration of simulated edge device modules into existing models. Indeed, the framework definition may include publishing standardized API definitions thereby allowing for third-party applications to interact with the defined framework.

The anomaly database may be an important component of the edge infrastructure. Workflow configuration parameters, results logging, binary searches and pruning based on results from prior runs may be enabled, for instance, by a structured query language (SQL) integrated database. Most or all interactions with the database may be via the control UI. This control UI arrangement may facilitate security and integrity of stored data. Workflow configuration information, observed system performance, and the resulting solution characteristics may be mapped in each tuple in the edge infrastructure's database. This mapped correlation may facilitate the building of functions and the extrapolation of solution characteristics and system performance for a range of incrementing workload parameters thus giving the edge architecture the ability to run thousands of permutations. The mapping and running permutations may be via the aggregation device or other computing device in the edge architecture.

As indicated, the IoT edge infrastructure of FIG. 3 may be a gateway model. Various permutations of gateway architectures may enable the user to execute the various workflows through each of these permutations. The number of permutations could result in millions of runs with just a few permutations. In some examples, an anomaly lookup table is employed, as discussed below. IoT solution implementations may be complex which include interconnecting interactions between edge sensors that exhibit continuously varying publish-characteristics. The implementations may include data aggregation at the gateway from various sensors for north bound propagation to central cloud services, and a higher-level aggregation at the cloud wherein intelligent decision making, analytics engineering, and actuation logic takes place.

In summary, the techniques including a computing device may execute profiling and diagnostics in an IoT system. Again, IoT deployments may be inherently complex given the edge protocols and applications or workloads, and the associated data-publish characteristics. An understanding of the data generated at the edge in real time may be important to identify and prevent, or reduce the occurrence of, failures including catastrophic system failures. See, for example, FIG. 5 as an applied technique to prevent or reduce occurrence of system failures. In operation to develop the anomaly database or lookup table, the workflows may be generated via executing or running multiple simulated or modeled iterations of features, and observing the resultant states of impacted features at various points in time during the simulation. The modeled iterations of features may include amount of random access memory (RAM), capability of central processing units (CPUs), number of Wi-Fi connections and Bluetooth connections, number of active Transmission Control Protocol (TCP) connections, etc. The resultant states of impacted features during the simulation may include CPU usage, memory usage, disk usage, network latency, and so on.

An anomaly condition can be defined as a condition wherein the observed state of features or characteristics, such as CPU usage, memory, disk usage, network latency, etc., are outside of normal parameters for the target solution workflow or have therein rendered the IoT system unusable or incapable of performing the tasks the IoT system was programmed to perform. The anomaly trend database may include the state of features or characteristics at various points in time prior to the above described anomaly condition occurring.

Examples of such anomaly conditions include an IoT system crash, saturated CPU usage, kernel crash, unintended reboot, saturated network link and similar abnormal operating parameters. Each condition can be represented as a specific set made up of the condition of one or many states, features, or characteristics in the IoT system. The sets of characteristics may include workload, architecture, solution characteristic value, and so on. Such sets may be noted before and after the given anomaly condition has occurred. The set stored may be stored as an entry in the anomaly database or anomaly trend database with varying weights based on the severity of the resultant condition. For example, a kernel crash may be given more weight than a saturated network link. Subsequently, an assumption may be that anomaly trend entries are already generated and provided in the anomaly trend database through the multiple simulation runs described above. Tables 1-3 below are examples of anomaly trend entries.

TABLE 1

| Trend Entry 1 | |
| --- | --- |
| 5-minute Load average in a 4 core system | 2.50 |
| Free memory in a 4 GB system | 1.5 GB |
| Disk usage | 75% |
| Network usage in a system with 1 GB | >70% |

TABLE 2

| Trend Entry 2 | |
| --- | --- |
| 5-minute Load average in a 4 core system | 2.75 |
| Free memory in a 4 GB system | 1.75 GB |
| Disk usage | 80% |
| Network usage in a system with 1 GB | >75% |

TABLE 3

| Trend Entry 3 | |
| --- | --- |
| 5-minute Load average in a 4 core system | 3.80 |
| Free memory in a 4 GB system | 0.5 GB |
| Disk usage | 95% |
| Network usage in a system with 1 GB | >90% |

Lastly, all of the devices depicted in the IoT system 300 of FIG. 3 can represent physical devices that are existing and real. However, any of the devices depicted in the IoT system 300 of FIG. 3 could be virtual or simulated. Indeed, the architectural elements disclosed herein such as IoT objects, network entities, servers, gateways or other nodes can be either real, virtual, or simulated. There may be an interchangeability of real, virtual, and simulated with respect to the depictions and representations of IoT system devices in the present specification and drawings. Moreover, the simulations for evaluating and detecting anomalies may run and operate in an environment where both live IoT systems and the simulation/emulation are running together to consider, for example, an expansion of an IoT system by testing the proposed architecture. Thus, embodiments may include a hybrid of live and simulated/emulated systems. This hybrid set-up may accommodate opportunity to test, for instance, system capacity and fault recovery scenarios. Moreover, the proposed expansion for an architecture may involve already-installed or existing devices outside of the IoT system to which the IoT system will incorporate or tie into, or can involve new IoT devices to be installed, and so on.

FIG. 4 is an example method 400 for identifying and building an anomaly database or anomaly trend database. The building of the anomaly database via method 400 may be generating at least one element or entry for the anomaly database for the IoT system. The entry may include a simulated solution characteristic that is an anomaly at a workload for a gateway architecture characteristic. In some examples, the anomaly database could be existing and the method 400 adds such entries to the anomaly database. The method starts, as indicated by block 402.

At blocks 406, 408, and 410, respectively, simulated iterations include workloads Wi considered for an architecture or gateway characteristics Gi and the resulting observed solution characteristics Si in the model or simulation. At blocks 410, 412, and 414, If a gateway characteristic Gi and simulated solution characteristic Si indicate an anomaly for a given workload Wi, then the solution characteristic Si value along with any additional information is designated as an anomaly, and the anomaly added to the anomaly database. With or without development of the anomaly, the simulated iterations continue, as indicated by reference numerals 416, 418, and 420 until i=n the number of cases to be considered and then at block 412, the method stops.

Figure 5:
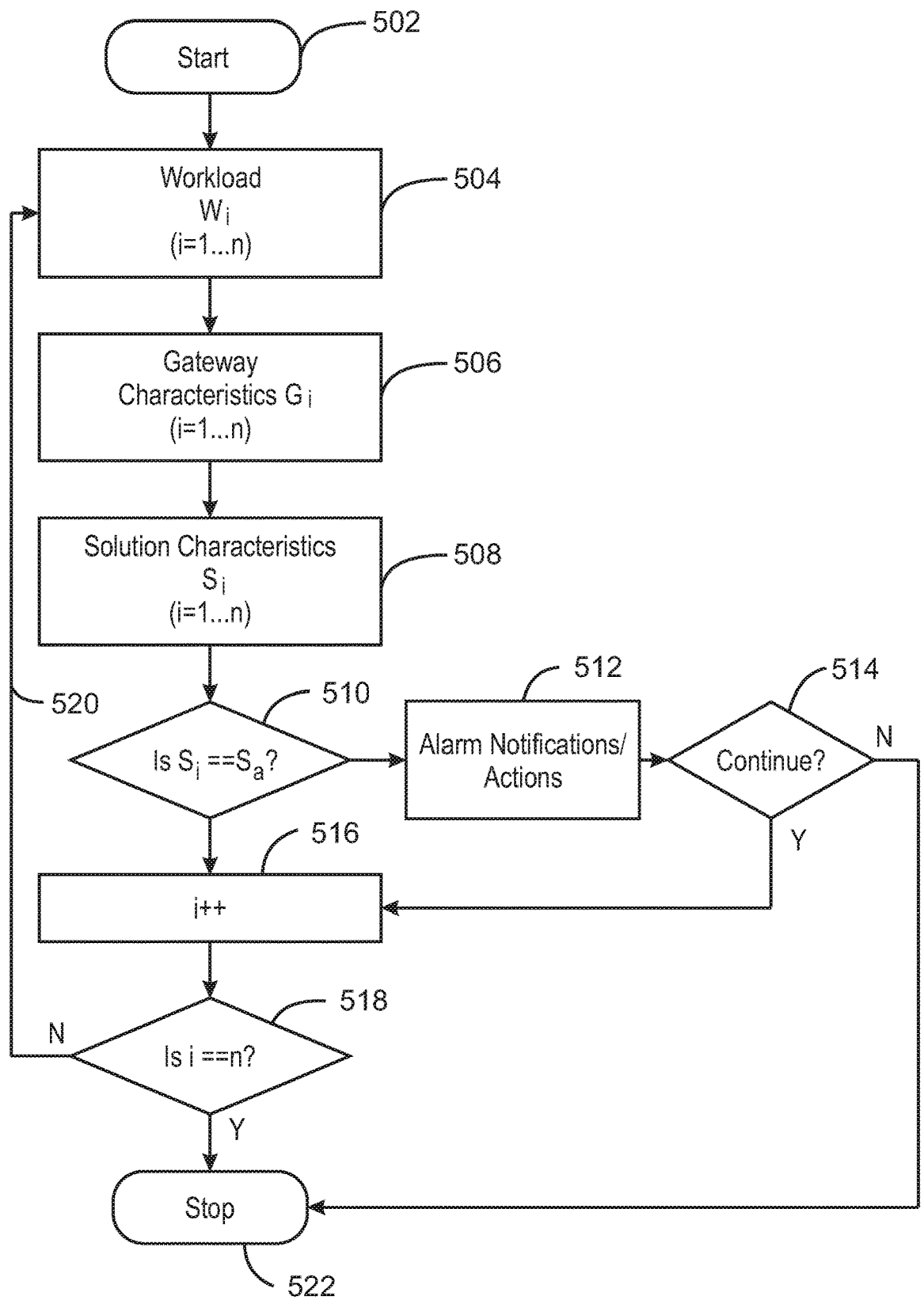
FIG. 5 is a block diagram of a method for profiling and evaluating workflow trends, including diagnosing and evaluating workflows against an anomaly lookup database, in accordance with embodiments of the present techniques.

Next, with an anomaly database generated, then workflow trend evaluation and anomaly prevention or reduction may be implemented, such as online in real time on an IoT system. FIG. 5 describes the early anomaly lookup and detection, notification, and resultant corrective actions in an active IoT system. The observed set of parameters of a running IoT edge system at points in time is reflected by the gateway characteristics G of the system. The G combined with the workflow W currently being executed on that system can be termed the solution characteristic S of the system. Notation can be 1/1'→2/2' yielding 3/3'. This set can be compared against the entries in the anomaly or anomaly trend database to find a potential match.

Should a match be found, the match may generally indicate that the system is trending towards an anomaly condition. In certain examples, corrective action may be employed before the anomaly condition occurs. The match may indicate an anomaly exists and the corrective action to mitigate the anomaly. An alarm notification may be sent to indicate the existence of the anomaly or the trend toward the anomaly. The alarm notification may include, for example, alerts through a device management system, or email alerts, custom triggers to notify another system for a custom action, etc. Examples of matching the anomaly database entry to the current set of observed behaviors is depicted FIGS. 5 and 6. Notation for employing the lookup table can be: $1_d/1_a'$-----$3_d/3_a'$, $1_1/1_1'$-----$3_1/3_1'$, $1_2/1_2'$-----$3_2/3_2'$ ... $1_n/1_n'$-----$3_n/3_n'$. If at time $t_1$, n is trending towards anomaly a, then at time $t_2$ sound the preventive alarm. Events $1_{1...2}/1'_{1...2}$ are recorded with their timestamps for replay.

The notification may then be followed by a pre-determined set and sequence of action(s) to be taken. An action may include a corrective measure, for instance, to attempt to bring the system to a usable state and continue operations. For example, if memory usage is abnormal, the action may identify the top user-space or system process and force the process to exit, and so on. If such said corrective actions are not possible and the trend indicates that the system will result in an unrecoverable anomaly condition, the technique may halt the system, such as trigger a forced shutdown. A shutdown may prevent or reduce any further resource (e.g., CPU, memory, network, etc.) exhaustion and facilitate a manual recovery process and post mortem diagnosis.

Thus, the techniques may provide for anomaly lookup and anomaly alarm. As mentioned, FIG. 5 describes an example of anomaly lookup and identification of an anomaly condition that has occurred in an active IoT system. Observed set of parameters of a running IoT system at points in time are generally the gateway characteristics G of the system. Again, the gateway characteristics combined with the workflow W currently being executed on that system can give the solution characteristic S of the system (e.g., 1/1'---->2/2' yielding 3/3'). This set of G, W, S can be compared against the entries in the anomaly database to find a potential match, e.g., lookup table 1a/1a'-----3a/3a', and solution characteristics are analyzed for 3a/3a', 3/3'=3a/3a'? then 1/1'---->1a/1'a.

As discussed, should a match be found, the system may be said to be in an anomaly condition and an alarm notification may be triggered to indicate the anomaly condition. The anomaly condition may be an existing anomaly or a trend toward an anomaly. Again, notifications may include alerts through a device management system, email alerts, custom triggers to notify another system for a custom action, and the like. The notification may then be followed by a pre-decided set and sequence of actions to be taken, which could include a corrective measure to attempt to bring the system to a usable state and continue operations.

FIG. 5 is block diagram of a method 500 for profiling and evaluating workflow trends, including diagnosing and evaluating workflows against an anomaly lookup database. The method starts at block 502. At blocks 504, 506, and 508, iterations are conducted, as discussed above, with workflow Wi, gateway characteristics Gi, and solution characteristics Si, respectively. At blocks 510 and 512, if the solution characteristic Si matches an anomaly Sa in the anomaly database, then an alarm or notification is issued. Further actions, such as corrective actions, may be performed. At block 514, a decision is made to continue or discontinue the iterations. For example, if the IoT system is shutdown, the method may stop at block 522. At block 516, the iteration number i is incremented by one. Lastly, at block 518, if i has not reach n the number of iterations, the method continues through the iterations. On the other hand, at block 518, if i reaches n, the method stops at block 522.

Figure 6:
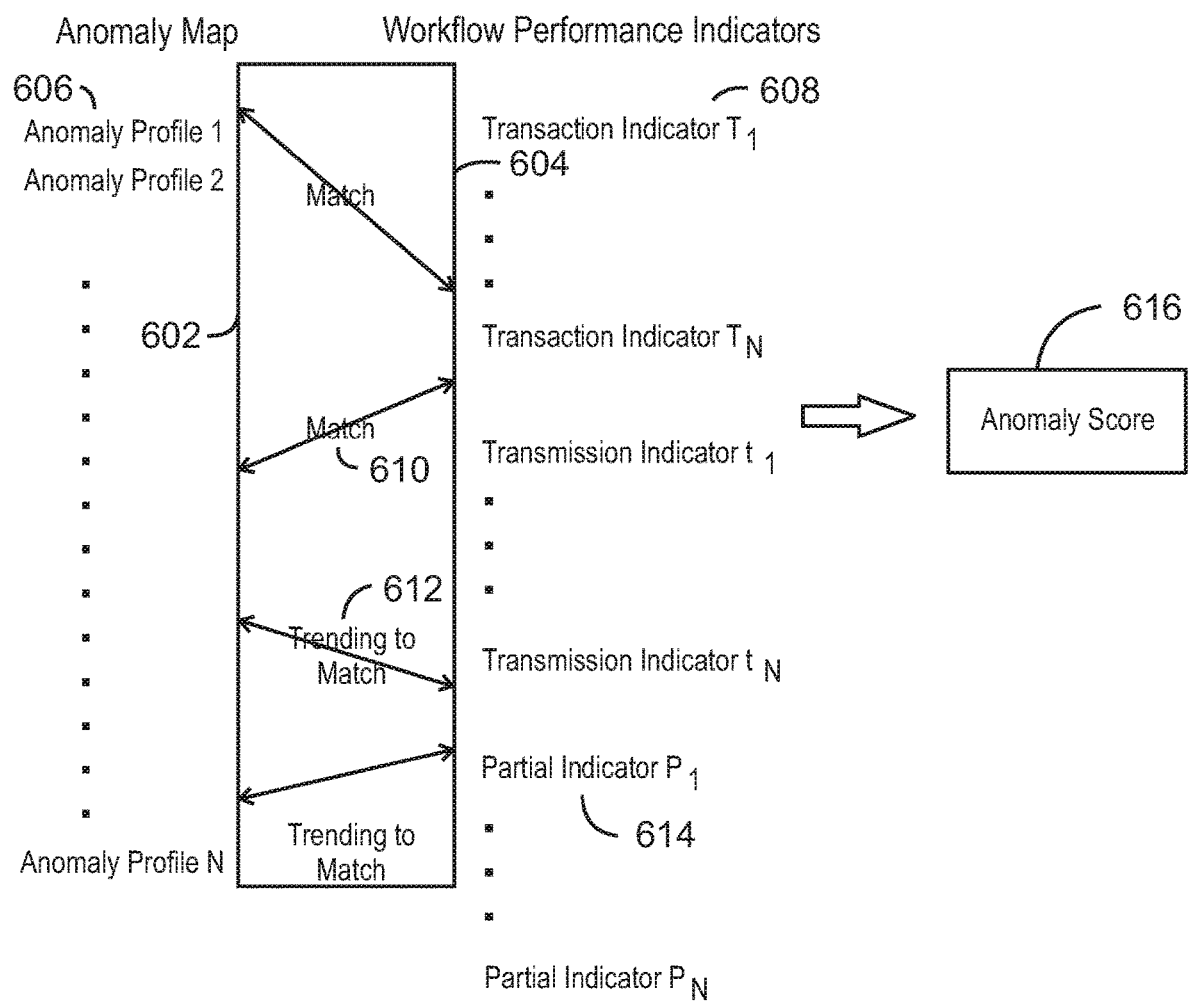
FIG. 6 is schematic diagram of a matching technique between an anomaly database and workflow performance indicators to identify an anomaly in accordance with embodiments of the present techniques.

FIG. 6 is diagram 600 of a matching technique between an anomaly database and workflow performance indicators to identify an anomaly. The illustration may represent an anomaly map 602 versus workflow performance indicators 604. Anomaly profiles 606 may be matched 610 or trending to match 612 with transaction indicators 608 as well as with other indicators 614 such as transmission indicators and partial indicators, to give an anomaly score 616. A transaction indicator may be parameters associated within the compute system, such as involving lookup latency, compute latency, memory utilization, and the like. A transmission indicator may be, for example, hop-to-hop latency, publish frequency, and so forth. A partial indicator may be when either of the transaction indicator or transmission indicator are not quite an anomaly yet but are trending towards that end state. Indeed, in all, the determination may be that the IoT system is in an anomaly condition or is trending toward an anomaly condition. Anomaly score determination may be a function inclusive of priorities of workflow events or other factors. The score determination function and the workflow priorities may be defined by the user.

Moreover, with respect to scoring, while certain events while may be anomalies, their overall impact may be relatively insignificant and hence have a lower score. For instance, the log buffer utilization may have gone from 1% to 7% for the same workflow indicating an anomaly, but the condition may generally have no major bearing on the functioning of the system as a whole and hence may be scored down.

FIG. 7 is a system 700 diagram depicting data flow for creating the anomaly database and for anomaly detection using that database. The system may include an edge device 702 which may be coupled to or include sensors 704. The edge device 702 may receive input from the sensors 704. In certain examples, the edge device 702 is an aggregation device such as the aggregation device 302 of FIG. 3. The edge device 702 may perform data learning 706 and generate an anomaly database 708, include an anomaly database 708, or utilize an anomaly database 708 to perform data analysis 710 and anomaly detection 712. Certain embodiments accommodate the flow of data into the learning engine, and analysis and base lining of this data. The addition of data points into the database and the lookup sequence may identify anomalies.

Thus, embodiments of present techniques may include mapping edge observed workloads to baseline solution characteristics, including in real time. Involved may be a multi-tuple database that consists of multiple solution and application or workload characteristics. Also included may be a mapping between the input workloads and the observed solution characteristics. The techniques may involve a lookup process that gathers real time solution characteristics metrics and performs lookups against a solutions characteristics database which is an anomaly database. The system may accommodate one or more combinations of observed solution characteristics to be referenced by a tagged profile. Some examples may prevent fatal conditions, or reduce occurrence of fatal conditions, by predicting workflow trends by evaluating observed characteristics or solution trends. Linear and non-linear equations may predict solution characteristics trends based on observed solution characteristics.

The system may include circuit-breaker logic that associates a series of conditions to a failover condition. The techniques may account for one or more solution characteristics that that contribute to a rising or dipping watermark (e.g., an alarm limit), with configurable limits for alarms, cumulatively referred to as the circuit breaker process in some examples. In certain examples, the set of incrementing workload configurations that lead to a set of predetermined fatal conditions may set off an alarm for the user or admin to take precautionary steps. A set of automated actions that execute on these preemptive actions may be referred to as "circuit breaker" logic.

Figure 8:
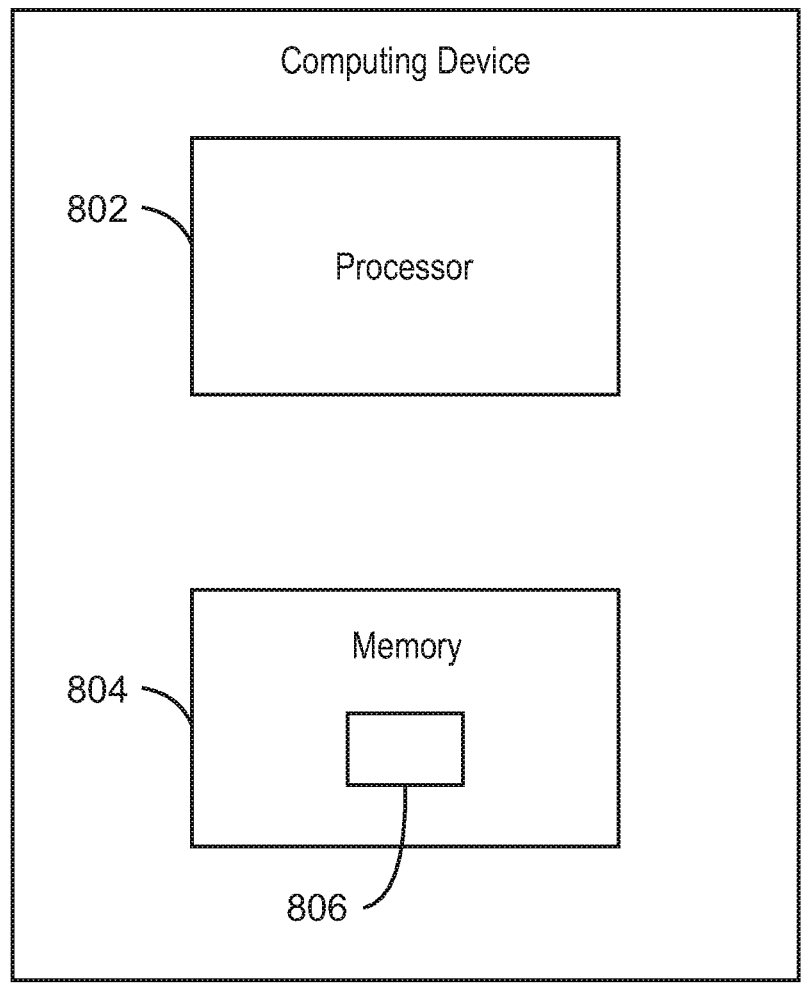
FIG. 8 is a block diagram of a computing device in accordance with embodiments of the present techniques.

FIG. 8 is a diagram of a computing device 800, such as a computing system, server, aggregation device, sensor, remote computer, and the like. While FIG. 8 depicts one computing device 800, embodiments may employ multiple computing devices 800. The computing 800 includes a processor or hardware processor 802 such as a microprocessor, a central processing unit or CPU, an application-specific integrated circuit (ASIC), and so forth. The processor 802 may be multiple processors and each processor 202 may have multiple cores. The computing device 800 has memory 804, such as non-volatile memory, volatile memory, and other types of memory. The nonvolatile memory may be a hard drive, read-only-memory or ROM, etc. The volatile memory may be random access memory or RAM, cache, etc.

In the illustrated example, the memory 804 stores code 806, e.g., instructions, logic, etc., executable by the one or more processors 802. The code 804 may be executed by the processor 804 to implement the techniques discussed herein, such as profiling, building the anomaly database, applying the anomaly database, diagnostics, and so on. In some examples, the code is executable by the processor to perform a simulation to generate an anomaly database for the IoT system, to match in real time an observed solution characteristic of the IoT system to an anomaly in the anomaly database, and issue a notification in response to the match. Further, respective actions may be implemented by different computing devices 800. For example, one computing device may have code 806 to build the anomaly database, and another computing device 800 may have the code 806 to apply the database online to detect an anomaly, or detect a trend toward an anomaly, in the IoT system.

Furthermore, while FIG. 8 represents a device 800 such as an aggregation device, server, remote computing device, etc., the processor(s) 802 and memory 804 having the stored executable code 806 may instead or additionally be in a distributed computing system such as across multiple compute nodes. Also, the computing device may include an ASIC customized for the techniques described. Lastly, the code 806 or ASIC may include a database generator, anomaly matcher, notification issuer, corrective action implementer, and so forth.

Figure 8A:
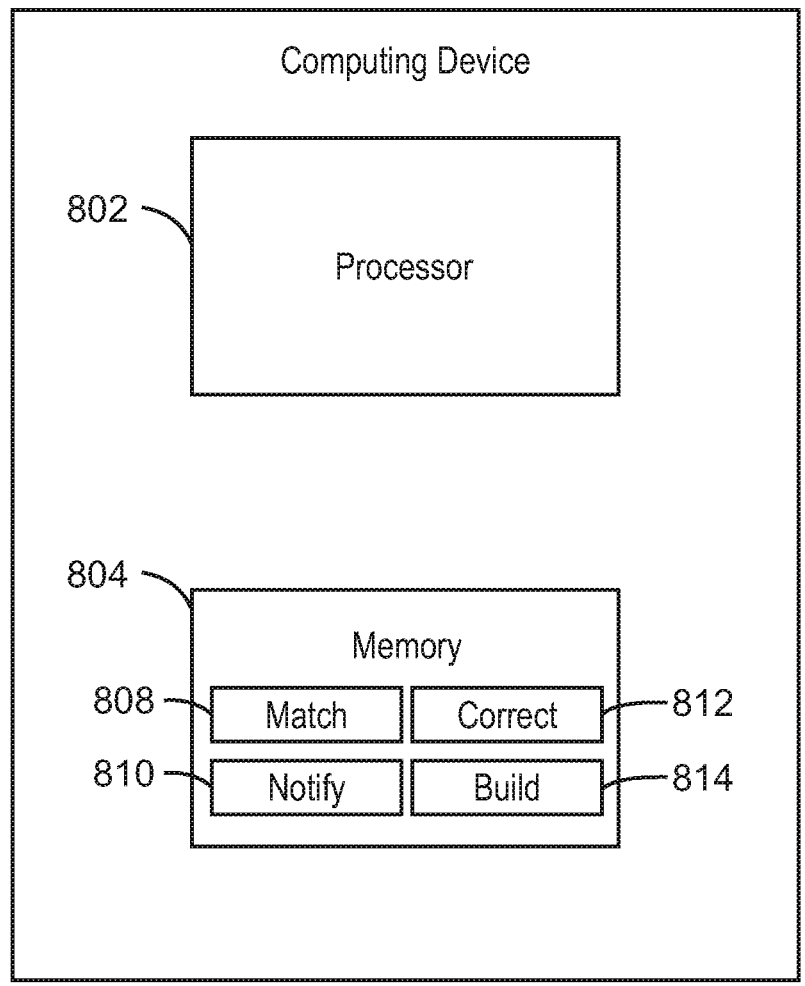
FIG. 8A is a block diagram of a computing device in accordance with embodiments of the present techniques.

FIG. 8A is a diagram of a computing device 800A similar to the computing device 800 of FIG. 8. The computing device 800A include the processor 802 and memory 804. Code executable by the processor 802 is stored in memory to direct the computing device 800A. For example, an anomaly matcher 808 directs the processor 802 and computing device 800A to match an observed solution characteristic of an IoT system to an anomaly in an anomaly database or solutions characteristic database. The match may be made in real time operation of the IoT system. Moreover, the match may mean the anomaly exists in the IoT system, or indicate a trend toward the IoT system to experience the anomaly, and so on. The anomaly database may be stored in memory of the computing device 800A or stored remote from the computing device 800A.

The computing device 800A may also include a notification issuer 810 to direct the processor 802 and the computing device 800A to issue a notification in response to a match of an observed solution characteristic to an anomaly (or trend to anomaly) in the anomaly database. The notification may include, for example, an alarm notification or prevent notification sent to indicate the existence of the anomaly or a trend toward the anomaly. The notification may include alerts through a device management system, email alerts, custom triggers to notify another system for a custom action, and the like.

The computing device 800A may include a corrective action implementer 812 to direct the processor 802 and the computing device 800A to facilitate implementing corrective action in response to the notification. In particular examples, the notification may be followed by a pre-determined set and sequence of corrective action(s). In certain examples, the corrective action may prevent or reduce likelihood of a failure in the IoT system, or mitigate or reduce impact of a failure or impending failure, and so on. A corrective measure may be an attempt to bring the system to a usable state and continue operations. In some instances, a corrective action may be to halt or shutdown the IoT system or portions of the IoT system.

The computing device 800A may include an anomaly database builder 814 to generate the aforementioned anomaly database or lookup table for the IoT system. The anomaly database may associate or map anomalies with IoT system workloads, architecture or gateway characteristics, and resulting solution or observed characteristics. Indeed, the generating of the anomaly database may involve iterating through workloads on the IoT system at gateway architecture characteristics of the IoT system giving resulting solution characteristics of the IoT system. In other words, generating the anomaly database may include adding a solution characteristic of the IoT system as an anomaly to the anomaly database in response to the solution characteristic and associated gateway characteristic of the IoT system indicating an anomaly (or trend toward anomaly) for a given workload on the IoT system.

Figure 9:
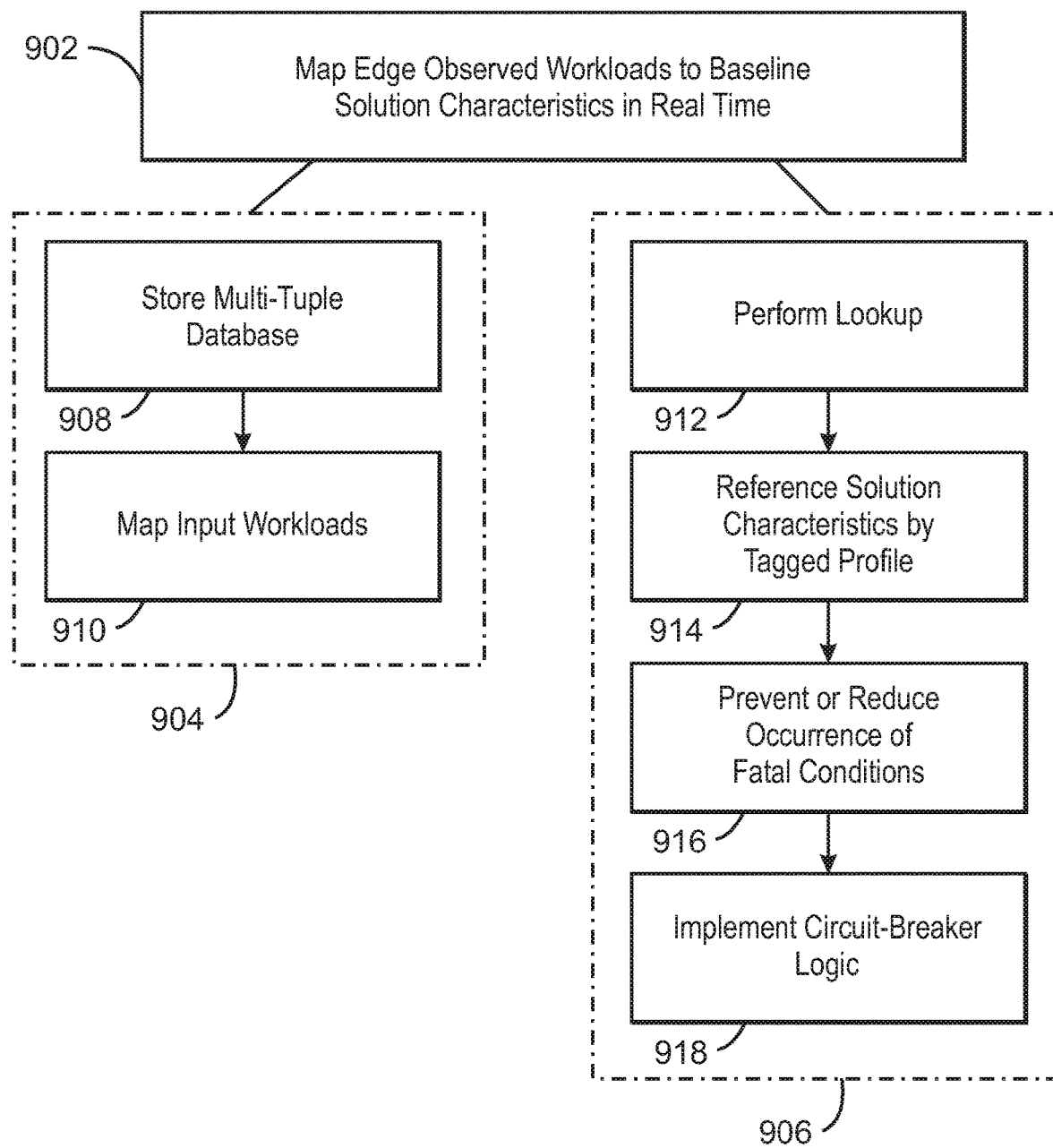
FIG. 9 is a block diagram of a method of profiling and diagnostics for an IoT system in accordance with embodiments of the present techniques.

FIG. 9 is a block diagram of a method 900, via one or more computing devices, of profiling and diagnostics for an IoT system. At block 902, the method is directed to mapping workloads (e.g., edge observed workloads) to baseline solution characteristics in real time in operation of the IoT system to detect anomalies or trends toward anomalies. At block 904, the method may develop an anomaly database or a solutions characteristics database. Solution characteristics that fall beyond set threshold values are flagged as anomalies. Thus, the anomaly database and this solution characteristics database may be synonyms for the same database. In some examples, development at block 904 of the anomaly database or solutions characteristics database may be performed offline, not in real time, in a simulation or model, etc. Then, the anomaly database or solutions characteristics database developed at block 904 may be applied online in real time to the IoT system, as noted in block 906.

Thus, there may be at least two phases. The first includes the determination of simulated solution characteristics and the mapping of the workloads to those simulated solution characteristics to develop the simulated solutions characteristics (values) database which may be an anomaly database. Again, these values are created via simulations, and anomaly entries are flagged accordingly for the solutions characteristics/anomaly database. The second phase generally occurs during a live run of the IoT system. In this instance, observed solution characteristics are as measured on a real gateway and compared against solution/anomaly conditions that were determined within the first phase.

At block 908, the development of the anomaly/solutions characteristics database may include storing initially a multi-tuple database. In particular, the multi-tuple database may be, for example, a multi-tuple database of multiple solution and application characteristics. At block 910, input workloads are mapped to observed solution characteristics to give the anomaly or solutions characteristics database. This solutions characteristics database may then be utilized in the real-time monitoring of the IoT system, as indicated in block 906.

At block 912, a lookup process is performed. In particular, the lookup process may include gathering real-time solution characteristics metrics and lookups against the solution characteristics database developed in the first phase. In other words, the look up sequence in a live deployment would involve performing comparisons of observed solution characteristics to recorded anomaly conditions.

At block 914, the method includes referencing solutions characteristics by a tagged profile. The tagged profile may refer to a series of values as described by a solution characteristic, such as CPU >80%, CPU queue 0>90% full, memory queue >50%, transmit latency >10 milliseconds (ms), etc. The referencing may include implementing linear and non-linear equations to predict solution characteristics trends based on observed solution characteristics. The technique may accommodate one or more solution characteristics that contribute to a rising or dipping watermark (e.g., alarm limit) with configurable limits for alarms, cumulatively referred to herein as the circuit breaker process. Indeed, the referencing may involve circuit-breaker logic that associates a series of conditions to a failover condition.

At block 916, the method includes preventing or reducing the occurrence of fatal conditions in the IoT system by predicting workflow trends by evaluating solution trends. Linear and non-linear equations may be employed by the computing device predict solution characteristics trends based on observed solution characteristics. or mitigate or reduce impact of a failure or impending failure, and so on. A corrective measure may be an attempt to bring the system to a usable state and continue operations. As mentioned, in some instances, a corrective action may be to halt or shutdown the IoT system or portions of the IoT system.

Figure 10:
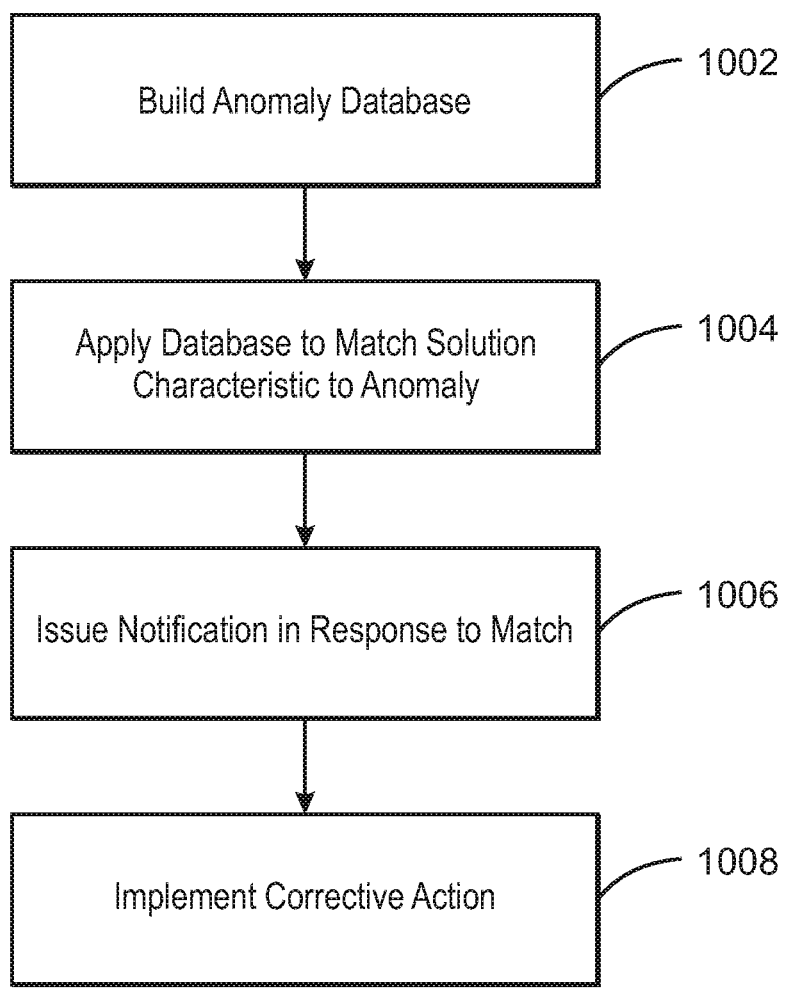
FIG. 10 is a block flow diagram of a method of profiling and diagnostics in accordance with embodiments of the present techniques.

FIG. 10 is method 1000, via one or more computing devices, of profiling and diagnostics for an IoT system. In some examples, the computing device is an aggregation device of the IoT system. The IoT system may include sensors coupled (e.g., wirelessly coupled) to the aggregation device which may act as a gateway to a cloud and servers.

At block 1002, the method generates an anomaly database or lookup table for the IoT system. The anomaly database may associate or map anomalies with IoT system workloads, architecture or gateway characteristics, and resulting solution or observed characteristics. Indeed, the generating of the anomaly database may involve iterating through workloads on the IoT system at gateway architecture characteristics of the IoT system giving resulting solution characteristics of the IoT system. In other words, generating the anomaly database may include adding a solution characteristic of the IoT system as an anomaly to the anomaly database in response to the solution characteristic and associated gateway characteristic of the IoT system indicating an anomaly for a given workload on the IoT system.

At block 1004, in application of the database to the IoT system, such as in real time operation of the IoT system, the method matches an observed solution characteristic of the IoT system to an anomaly in the anomaly database. The match may mean the anomaly exists, or indicate a trend toward the anomaly, and so on.

At block 1006, the method includes issuing a notification in response to the match. An alarm notification or prevent notification may be sent to indicate the existence of the anomaly or a trend toward the anomaly. The notification may include alerts through a device management system, email alerts, custom triggers to notify another system for a custom action, and so forth.

At block 1008, the method may further include implementing corrective action in response to the notification. In certain examples, the corrective action may prevent a failure in the IoT system associated with the anomaly, or at least reduce the likelihood of an occurrence of the failure. A corrective measure may be an attempt to bring the system to a usable state and continue operations. For example, if memory usage is abnormal, the action may force a process consuming memory to exit. If such intermediate corrective actions are problematic and the trend indicates that the system may reach an unrecoverable anomaly condition, the corrective or responding measure may be to halt the system, such as trigger a forced shutdown. A shutdown may prevent or reduce any further resource (e.g., CPU, memory, network, etc.) exhaustion and facilitate a manual recovery process and diagnosis.

Figure 11:
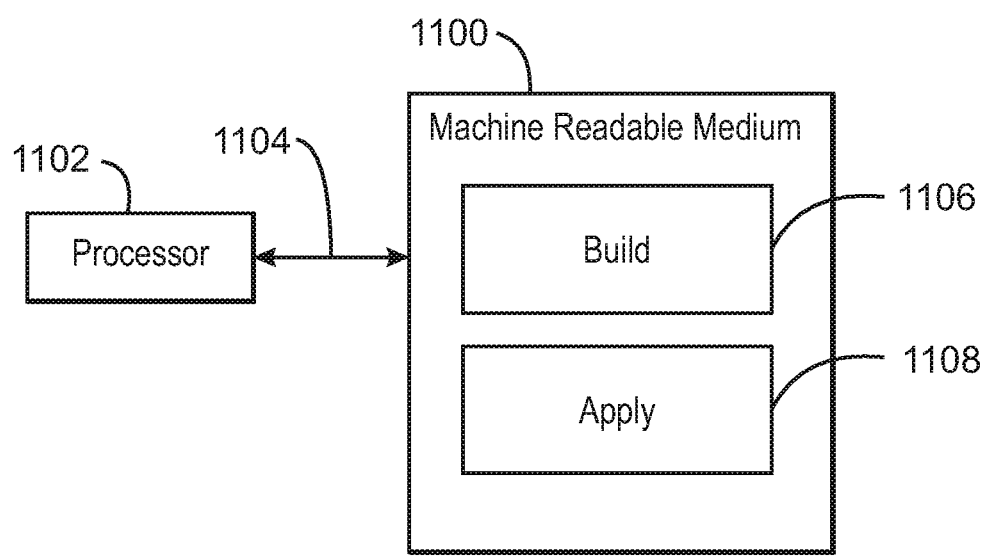
FIG. 11 is a block diagram illustrating a computer-readable medium to facilitate profiling and diagnostics in accordance with embodiments of the present techniques.

FIG. 11 is a block diagram depicting a tangible, non-transitory, computer-readable medium to facilitate profiling and diagnostics. The computer-readable medium 1100 may be accessed by a processor 1102 over a computer interconnect 1104. The processor 1102 may be an aggregation device processor, a sensor processor, a server processor, a remote computing device processor, or other processor. The tangible, non-transitory, computer-readable medium 100 may include executable instructions or code to direct the 1102 to perform the operations of the techniques described herein.

The various software components discussed herein may be stored on the tangible, non-transitory, computer-readable medium 1100, as indicated in FIG. 11. For example, a build module 1106 (executable code/instructions) may direct the processor 1102 to build an anomaly database. An apply module 1108 may direct the processor 1102 to implement the aforementioned diagnostic techniques using the anomaly database. It should be understood that any number of additional software components not shown in FIG. 11 may be included within the tangible, non-transitory, computer-readable medium 1100, depending on the application.

In some examples, a tangible, non-transitory, computer-readable medium stores code executable by a processor to direct the processor to generate an anomaly database for the IoT system, match an observed solution characteristic of the IoT system to an anomaly in the anomaly database, and issue a notification in response to the match. The computing device may be an aggregation device of the IoT system, the aggregation device coupled to sensors in the IoT system. Further, the code may be executable by the processor to direct the processor to facilitate implementing corrective action in response to the notification. The corrective action to prevent a failure in the IoT system associated with the anomaly.

The generating of the anomaly database may include in a simulation or model iterating through workloads on the IoT system at gateway architecture characteristics of the IoT system giving resulting solution characteristics of the IoT system. In other words, generating the anomaly database may involve adding a solution characteristic value with associated workload and gateway architecture description of the IoT system as an anomaly to the anomaly database in response to the simulate solution characteristic and associated gateway characteristic of the IoT system indicating an anomaly for a given workload on the IoT system.

Figure 12:
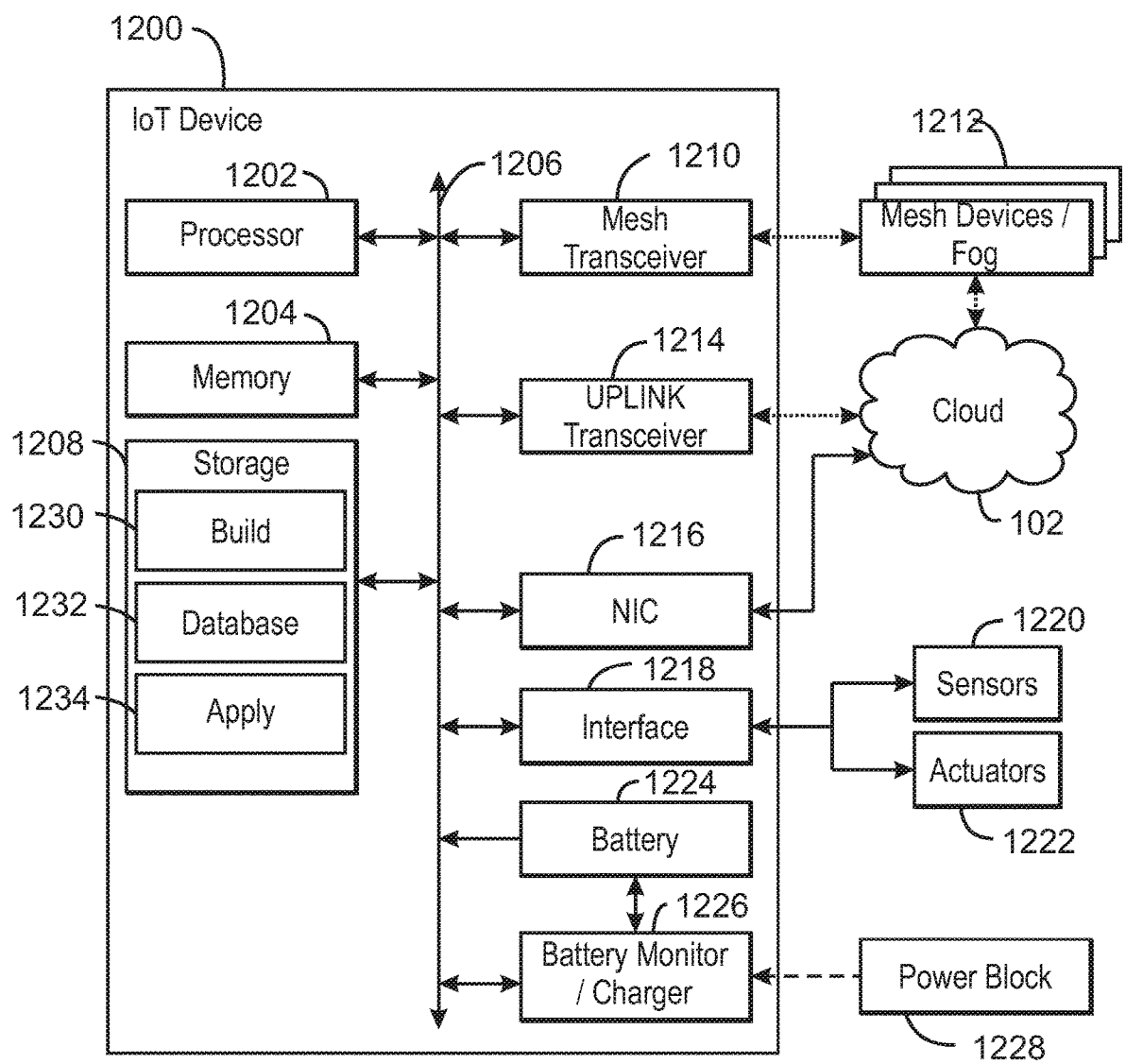
FIG. 12 is a diagram of a computing device for profiling or diagnostics in accordance with embodiments of the present techniques.

FIG. 12 is a block diagram of an example of components that may be present in an IoT device 1200 for profiling or diagnostics of an IoT system. The IoT device 1200 may include any combinations of the components shown in the example. The components may be implemented as ICs, portions thereof, discrete electronic devices, or other modules, logic, hardware, software, firmware, or a combination thereof adapted in the IoT device 1200, or as components otherwise incorporated within a chassis of a larger system. The block diagram of FIG. 12 is intended to show a high-level view of components of the IoT device 1200. However, some of the components shown may be omitted, additional components may be present, and different arrangements of the components shown may occur in other implementations.

The IoT device 1200 may include a processor 1202, which may be a microprocessor, a multi-core processor, a multithreaded processor, an ultra-low voltage processor, an embedded processor, or other known processing element. The processor 1202 may be a part of a system on a chip (SoC) in which the processor 1202 and other components are formed into a single integrated circuit, or a single package, such as the Edison™ or Galileo™ SoC boards from Intel. As an example, the processor 1202 may include an Intel® Architecture Core™ based processor, such as a Quark™, an Atom™, an i3, an i5, an i7, or an MCU-class processor, or another such processor available from Intel® Corporation, Santa Clara, Calif. However, any number of other processors may be used, such as those available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A9 processor from Apple® Inc., a Snapdragon™ processor from Qualcomm® Technologies, Inc., or an OMAP™ processor from Texas Instruments, Inc.

The processor 1202 may communicate with a system memory 1204 over a bus 1206. Any number of memory devices may be used to provide for a given amount of system memory. As examples, the memory can be random access memory (RAM) in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard, such as LPDDR3 or LPDDR4 that will offer extensions to LPDDR2 to increase bandwidth. In various implementations the individual memory devices may be of any number of different package types such as single die package (SDP), dual die package (DDP) or quad die package (Q17P). These devices, in some embodiments, may be directly soldered onto a motherboard to provide a lower profile solution, while in other embodiments the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs. For example, a memory may be sized between 2 GB and 16 GB, and may be configured as a DDR3LM package or an LPDDR2 or LPDDR3 memory, which is soldered onto a motherboard via a ball grid array (BGA).

To provide for persistent storage of information such as data, applications, operating systems and so forth, a mass storage 1208 may also couple to the processor 1202 via the bus 1206. To enable a thinner and lighter system design, the mass storage 1208 may be implemented via a solid state disk drive (SSDD). Other devices that may be used for the mass storage 1208 include flash memory cards, such as SD cards, microSD cards, xD picture cards, and the like, and USB flash drives. In low power implementations, the mass storage 1208 may be on-die memory or registers associated with the processor 1202. However, in some examples, the mass storage 1208 may be implemented using a micro hard disk drive (HDD). Further, any number of new technologies may be used for the mass storage 1208 in addition to, or instead of, the technologies described, such as resistance change memories, phase change memories, holographic memories, or chemical memories, among others. For example, the IoT device 1200 may incorporate the 3D XPOINT memories from Intel® and Micron®.

The components may communicate over the bus 1206. The bus 1206 may include any number of technologies, including industry standard architecture (ISA), extended ISA (EISA), peripheral component interconnect (PCI), peripheral component interconnect extended (PCIx), PCI express (PCIe), or any number of other technologies. The bus 1206 may be a proprietary bus, for example, used in a SoC based system. Other bus systems may be included, such as an 12C interface, an SPI interface, point to point interfaces, and a power bus, among others.

The bus 1206 may couple the processor 1202 to a mesh transceiver 710, for communications with other mesh devices 1212. The mesh transceiver 1210 may use any number of frequencies and protocols, such as 2.4 gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 1212. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, can occur via a WWAN unit.

The mesh transceiver 1210 may communicate using multiple standards or radios for communications at different ranges. For example, the IoT device 1200 may communicate with close devices, e.g., within about 10 meters, using a local transceiver based on BLE, or another low power radio, to save power. More distant mesh devices 1212, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee. The mesh transceiver 1210 may be incorporated into an MCU as an address directly accessible by the chip, such as in the Curie® units available from Intel.

An uplink transceiver 1214 may be included to communicate with devices in the cloud 102. The uplink transceiver 1214 may be LPWA transceiver that follows the IEEE 802.15.4, or IEEE 802.15.4g standards, among others. The IoT device 1200 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in IEEE 802.15.4e may be used.

Any number of other radio communications and protocols may be used in addition to the systems mentioned for the mesh transceiver 1210 and uplink transceiver 1214, as described herein. For example, the radio transceivers 1210 and 1212 may include an LTE or other cellular transceiver that uses spread spectrum (SPA/SAS) communications for implementing high speed communications, such as for video transfers. Further, any number of other protocols may be used, such as Wi-Fi networks for medium speed communications, such as still pictures, sensor readings, and provision of network communications.

The radio transceivers 1210 and 1214 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology. Other Third Generation Partnership Project (3GPP) radio communication technology that may be used includes UMTS (Universal Mobile Telecommunications System), FOMA (Freedom of Multimedia Access), 3GPP LTE (Long Term Evolution), 3GPP LTE Advanced (Long Term Evolution Advanced), 3GPP LTE Advanced Pro (Long Term Evolution Advanced Pro)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+(High Speed Packet Access Plus), UMTS-TDD (Universal Mobile Telecommunications System—Time-Division Duplex), TD-CDMA (Time Division—Code Division Multiple Access), TD-SCDMA (Time Division—Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP LTE Extra, LTE Licensed-Assisted Access (LAA), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handyphone System), WiDEN (Wideband Integrated Digital Enhanced Network), iBurst, Unlicensed Mobile Access (UMA, also referred to as also referred to as 3GPP Generic Access Network, or GAN standard)), Wireless Gigabit Alliance (WiGig) standard, mmWave standards in general (wireless systems operating at 10-90 GHz and above such as WiGig, IEEE 802.11ad, IEEE 802.11 ay, and the like. In addition to the standards listed above, any number of satellite uplink technologies may be used for the uplink transceiver 1214, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 1216 may be included to provide a wired communication to the cloud 102. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 1216 may be included to allow connection to a second network, for example, a NIC 1216 providing communications to the cloud over Ethernet, and a second NIC 1216 providing communications to other devices over another type of network.

The bus 1206 may couple the processor 1202 to an interface 1218 that may be used to connect external devices. The external devices may include sensors 1220, such as accelerometers, level sensors, flow sensors, temperature sensors, pressure sensors, barometric pressure sensors, and the like. The interface 1218 may be used to connect the IoT device 1200 to actuators 1222, such as power switches, valve actuators, an audible sound generator, a visual warning device, and the like.

While not shown, various input/output (I/O) devices may be present within, or connected to, the IoT device 1200. For example, a display may be included to show information, such as sensor readings or actuator position. An input device, such as a touch screen or keypad may be included to accept input.

A battery 1224 may power the IoT device 1200, although in examples in which the IoT device 1200 is mounted in a fixed location, it may have a power supply coupled to an electrical grid. The battery 1224 may be a lithium ion battery, a metal-air battery, such as a zinc-air battery, an aluminum-air battery, a lithium-air battery, and the like.

A battery monitor/charger 1226 may be included in the IoT device 1200 to track the state of charge (SoCh) of the battery 1224. The battery monitor/charger 1226 may be used to monitor other parameters of the battery 1224 to provide failure predictions, such as the state of health (SoH) and the state of function (SoF) of the battery 1224. The battery monitor/charger 1226 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 1226 may communicate the information on the battery 1224 to the processor 1202 over the bus 1206. The battery monitor/charger 1226 may also include an analog-to-digital (ADC) convertor that allows the processor 1202 to directly monitor the voltage of the battery 1224 or the current flow from the battery 1224. The battery parameters may be used to determine actions that the IoT device 1200 may perform, such as transmission frequency, mesh network operation, sensing frequency, and the like. This may be related back to the failure operations being performed discussed above.

A power block 1228, or other power supply coupled to a grid, may be coupled with the battery monitor/charger 1226 to charge the battery 1224. In some examples, the power block 1228 may be replaced with a wireless power receiver to obtain the power wirelessly, for example, through a loop antenna in the IoT device 1200. A wireless battery charging circuit, such as an LTC4020 chip from Linear Technologies of Milpitas, Calif., among others, may be included in the battery monitor/charger 1226. The specific charging circuits chosen depend on the size of the battery 1224, and thus, the current required. The charging may be performed using the Airfuel standard promulgated by the Airfuel Alliance, the Qi wireless charging standard promulgated by the Wireless Power Consortium, the Rezence charging standard, promulgated by the Alliance for Wireless Power, among others.

The mass storage 1208 may include a number of modules to implement the anomaly database build and applications described herein, as indicated by reference numerals 1230, 1232, and 1234. Block 1230 may be executable code to build the anomaly database. Block 1332 may be the anomaly databased stored in the memory storage 1208. Block 1234 may be executable code stored to detect an anomaly employing the anomaly database online in real time operation of the IoT system.

Although shown as code blocks in the mass storage 1208, it may be understood that any of the modules may be replaced with hardwired circuits, for example, built into an application specific integrated circuit (ASIC). The mass storage 1208 may further include and store other functional blocks, such as a control UI for accessing configuration parameters, and an automation framework that may provide application program interfaces (APIs) for the interaction of canned trigger scripts. Other functional blocks that may be present include accelerated processing units (APUs) in the automation framework that exchange a standard set of timing information that allows trigger scripts to identify synchronous versus staggered starts. An IoT database may be includes to store workflow configuration information, observed system performance, and resulting solution characteristics. Interactions with the IoT database may be via the control UI.

The aforementioned computing devices such as the gateway device 100, fog device 200, aggregation device 302, IoT sensor devices or sensor device modules, servers, computing device 800 and 800A, IoT device 1200, and so forth, may implement a method or actions via as one or more computing devices, including implementing profiling and diagnostics in an IoT system. The profiling and diagnostics may include mapping, in real-time operation of the IoT system, edge observed workloads of the IoT system to baseline solution characteristics, wherein the mapping comprises applying a solutions characteristics database. The baseline solution characteristics may be characteristics in the solutions characteristics database. The profiling or diagnostics may include detecting anomalies or trends toward anomalies based on the mapping. The aforementioned computing devices may gather metrics of observed real-time solution characteristics, wherein applying the solutions characteristics database in the real-time operation of the IoT system may include performing lookups in the solution characteristics database to compare the observed real-time solution characteristics against solutions characteristics in the database. The computing device may reference the solutions characteristics, baseline solution characteristics, or observed solutions characteristics by a tagged profile. The computing device may execute linear equations or non-linear equations, or both, to predict solution characteristics trends based on observed solution characteristics. The computing device may include a circuit breaker accommodating one or more solution characteristics that contribute to a rising or dipping watermark with configurable limits for alarms. A circuit-breaker logic may associate a series of conditions to a failover condition. In some examples, the computing device may prevent or reduce occurrence of fatal conditions in the IoT system by predicting workflow trends by evaluating solution trends. The computing device and implemented method may include developing the solutions characteristics database.

The solutions characteristics database or anomaly database may be developed offline via a simulation of the IoT system and not in the real-time operation of the IoT system. Developing the solutions characteristics database may involve storing a multi-tuple database of multiple solution characteristics and multiple workload characteristics. Indeed, developing the solutions characteristics database may include mapping input workloads to observed solution characteristics in the simulation. Applying the solutions characteristics database may include utilizing the solutions characteristics database in the real-time monitoring of the IoT system.

In the description and claims, the terms "coupled" and "connected", along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infra-red signals, digital signals, or the interfaces that transmit or receive signals, among others.

An embodiment is an implementation or example. Reference in the specification to "an embodiment", "one embodiment", "some embodiments", "various embodiments", or "other embodiments" means that a particular feature, structure, or characteristic described in connection with the embodiments is included in at least some embodiments, but not necessarily all embodiments, of the present techniques. The various appearances of "an embodiment", "one embodiment", or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can", or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement or order of circuit elements or other features illustrated in the drawings or described herein need not be arranged in the particular way illustrated and described. Many other arrangements are possible according to some embodiments.

In each system shown in a figure, the elements in some cases may each have a same reference number or a different reference number to suggest that the elements represented could be different or similar. However, an element may be flexible enough to have different implementations and work with some or all of the systems shown or described herein. The various elements shown in the figures may be the same or different. Which one is referred to as a first element and which is called a second element is arbitrary.

Code Examples

The following examples are only examples and not meant to limit the present techniques. Other code examples are applicable to implement embodiments of the present techniques 1. Calculates the # of sensors, publish interval, burst count, and CPU Usage Profiler Code:

```
def profile( ):
    globalcount,g_avg_pub_freq,g_aprx_pub_freq,g_avg_burst_count,pub_msg
    count = (count%10) + 1
    for i in range(len(time_list)1):
        time2 = time_list[i+1].split(" ")[0]
        time1 = time_list[i].split(" ")[0]
        exec_time = float((datetime.datetime.strptime(time2, FMT) datetime.
                    datetime.strptime(time1, FMT)).total_seconds( ))
        exec_time *= 1000
        exec_time_list.append(exec_time)
    os.system("clear")
    cmd = "netstat -lantp | grep -E 'mosquitto.*ESTABLISHED|ESTABLISHED.
            *mosquitto' | grep v '127.0.0.1' |wc I"
    proc=Popen(cmd,shell=True,stdout=PIPE, )
    num_sensor=int(proc.communicate( )[0]) – 1
    avg_burst_count = sum(burst_count)/len(burst_count)
    if (g_avg_burst_count == 0):
        g_avg_burst_count = avg_burst_count
    else:
        g_avg_burst_count = g_avg_burst_count + ( float(avg_burst_count
            g_avg_burst_count) / count)
    avg_pub_freq = sum(interval_list)/len(interval_list)
    if (g_avg_pub_freq == 0):
        g_avg_pub_freq = avg_pub_freq
    else:
        g_avg_pub_freq = g_avg_pub_freq + ( float(avg_pub_freq g_avg_pub_freq) /
            count)
    #print " Count: ",count
    print "Number of sensors: ",num_sensor
    print "Avg publish interval: "+ str(g_avg_pub_freq)+" seconds"
    print "Avg Burst Count: "+str(g_avg_burst_count)
    cpu_usage = psutil.cpu_times_percent( ).user
    print "CPU Usage: "+str(cpu_usage)
```

2. Defining fault profile.

Determining Solution "Fault" Profile+Code to Build DB

```
import MySQLdb as mdb
con = mdb.connect('localhost', 'ADuser', 'AD123', 'ADdb');
    with con:
        cur = con.cursor( )
        cur.execute("DROP TABLE IF EXISTS ADProfiles")
        # CPU Freq in MHz, RAM in GB, Pub Rate in seconds, CPU Usage in percent
```

```
# Load Avg from Platform, Free Memory in MB,
# Disk Usage in percentage, Network Usage in percentage
cur.execute("CREATE TABLE ADProfiles(Id INT PRIMARY KEY
        AUTO_INCREMENT, \
    CPUFreq INT, RAM INT, NumSensors INT, PubRate INT, \
        BurstCount INT, CPUusage INT, LoadAvg INT, FreeMem INT, \
    DiskUse INT, NwUse INT)")
def DB_Build(freq, ram, numSensors, pubRate, burstCount, cpuUsage, IdAvg,
        memFree, diskUse, nwUse):
    # Add profiled characteristics to Database if
    # CPU > 90, Load Average > 1, Free memory < 500 MB, Disk Usage > 90,
        Network Use > 80
    if (cpuUsage > 90) and (IdAvg > 1) and (memFree < 500) and (diskUse > 90) and
            (nwUse > 80):
        con = mdb.connect('localhost', 'ADuser', 'AD123', 'ADdb');
        with con:
            cur = con.cursor(mdb.cursors.DictCursor)
            cur.execute("INSERT INTO ADProfiles(CPUFreq, RAM, NumSensors,
                PubRate, BurstCount, CPUusage, LoadAvg,
FreeMem, DiskUse, NwUse) VALUES({ },{ },{ },{ },{ },{ },{ },{ },{ },{ })".format(freq, ram,
                numSensors, pubRate, burstCount,
cpuUsage, IdAvg, memFree, diskUse, nwUse))
            con.commit( )
```

3. Comparing known workflow and gateway characteristics that trigger a defined set of fatal conditions against real time workflow and gateway parameters derived from the profiler. Lookup Code (Compare to Workflow and Gateway "Fault" Profiles).

```
def lookupDB(freq, ram, numSensors, pubRate, burstCount, cpuUsage, IdAvg,
        memFree, diskUse, nwUse):
    #Lookup profiled characteristics with Anomaly characteristics
    con = mdb.connect('localhost', 'ADuser', 'AD123', 'ADdb');
    with con:
        cur = con.cursor(mdb.cursors.DictCursor)
        cur.execute("SELECT CPUusage, LoadAvg, FreeMem, DiskUse, NwUse
FROM ADProfiles WHERE CPUFreq = freq AND RAM = ram AND NumSensors =
numSensors AND PubRate = pubRate AND BurstCount = burstCount")
        rows = cur.fetchall( )
        for row in rows:
            if (cpuUsage >= row["CPUusage"]) and (IdAvg >= row["LoadAvg"]) and
(memFree <= row["FreeMem"]) and (diskUse >= row["DiskUse"]) and (nwUse >=
row["NwUse"])):
                #Trigger Quarantine code
                quarantine( )
                    print "Triggering quarantine code"
```

4. When a fatal workflow/gw characteristic is detected remedial measures are taken to prevent system failure. Quarantine Code—Port Shutdown Etc.
from subprocess import Popen, PIPE

```
def quarantine( ):
    #Trigger NW port eth0 shutdown
    my_cmd = "sudo ifconfig eth0 down"
    proc = subprocess.Popen(my_cmd, shell=True, stdout=subprocess.PIPE)
    print "eth0 shutdown"
```

Additional Examples are given. Example 1 is a computing device for an Internet of Things (IoT) system, the computing device to: perform profiling and diagnostics of the IoT system, comprising to: match an observed solution characteristic of the IoT system to an anomaly in an anomaly database; and issue a notification in response to the match.

Example 2 includes the computing device of example 1, including or excluding optional features. In this example, the computing device comprises an aggregation device of the IoT system, wherein the IoT system comprises sensors wirelessly coupled to the aggregation device, and wherein to match the observed solution characteristic to the anomaly in the anomaly database comprises real-time monitoring by the computing device of the IoT system.

Example 3 includes the computing device of any one of examples 1 to 2, including or excluding optional features. In this example, the computing device to facilitate implementing corrective action in response to the notification, and wherein the computing device comprises a processor and memory storing code executable by the processor to perform the profiling and diagnostics. Optionally, the corrective action to prevent a failure in the IoT system associated with the anomaly.

Example 4 includes the computing device of any one of examples 1 to 3, including or excluding optional features. In this example, to perform profiling and diagnostics comprises the computing device to generate the anomaly database, or to generate at least one entry for the anomaly database for the IoT system. Optionally, to generate the anomaly database comprises to perform a simulation to iterate through workloads on the IoT system at different gateway architecture characteristics of the IoT system giving resulting solution characteristics of the IoT system. Optionally, to generate the at least one entry for the anomaly database comprises to add a simulated solution characteristic of the IoT system as an anomaly to the anomaly database in response to the simulated solution characteristic indicating an anomaly for a given workload on the IoT system.

Example 5 is a method, by a computing device, for an Internet of Things (IoT) system. The method includes performing profiling and diagnostics of the IoT system, comprising: matching an observed solution characteristic of the IoT system to an anomaly in an anomaly database; and issuing a notification in response to the match; and implementing corrective action in response to the notification.

Example 6 includes the method of example 5, including or excluding optional features. In this example, the method includes preventing, via the corrective action, a failure in the IoT system associated with the anomaly, wherein the observed solution characteristic is based on the IoT system comprising a hybrid of live and simulated components.

Example 7 includes the method of any one of examples 5 to 6, including or excluding optional features. In this example, the computing device comprises an aggregation device of the IoT system, and wherein the IoT system comprises sensors coupled to the aggregation device.

Example 8 includes the method of any one of examples 5 to 7, including or excluding optional features. In this example, performing profiling and diagnostics comprises generating at least one element or entry for the anomaly database for the IoT system, comprising performing a simulation to iterate through workloads on the IoT system at characteristics of a gateway architecture of the IoT system giving resulting simulated solution characteristics of the IoT system. Optionally, the gateway architecture comprises a hybrid of live and emulated components of the IoT system, and wherein generating the at least one entry for the anomaly database comprises adding a simulated solution characteristic of the IoT system as an anomaly to the anomaly database in response to the simulated solution characteristic and associated gateway characteristic of the IoT system indicating an anomaly for a given workload on the IoT system.

Example 9 is a tangible, non-transitory, computer-readable medium. The computer-readable medium includes instructions that direct the processor to generate at least one entry of an anomaly database for an IoT system, comprising to perform a simulation to iterate through workloads on the IoT system at different gateway architecture characteristics of the IoT system giving resulting simulated solution characteristics of the IoT system, wherein the at least one entry comprises a simulated solution characteristic; match an observed solution characteristic of the IoT system to an anomaly in the anomaly database; and issue a notification in response to the match.

Example 10 includes the computer-readable medium of example 9, including or excluding optional features. In this example, the code executable by the processor to direct the processor to facilitate implementing corrective action in response to the notification, wherein the corrective action to prevent a failure in the IoT system associated with the anomaly, wherein the computing device comprises an aggregation device of the IoT system, the aggregation device coupled to sensors in the IoT system, and wherein the gateway architecture characteristics are associated with a gateway architecture comprising a hybrid of live and simulated components of the IoT system.

Example 11 includes the computer-readable medium of any one of examples 9 to 10, including or excluding optional features. In this example, to generate the at least one entry for the anomaly database comprises to add the simulated solution characteristic of the IoT system as an anomaly to the anomaly database in response to the simulated solution characteristic and associated gateway architecture characteristic of the IoT system indicating an anomaly for a given workload on the IoT system.

Example 12 is a computing device for an Internet of Things (IoT) system, the computing device comprising: an anomaly matcher to match an observed solution characteristic of the IoT system to an anomaly in an anomaly database; and a notification issuer to issue a notification in response to the match.

Example 13 includes the computing device of example 12, including or excluding optional features. In this example, the computing device includes a corrective action implementer to facilitate implementing corrective action in response to the notification, wherein the anomaly matcher to match in real-time operation of the IoT system the observed solution characteristic to the anomaly in the anomaly database. Optionally, the corrective action to prevent a failure in the IoT system associated with the anomaly.

Example 14 includes the computing device of any one of examples 12 to 13, including or excluding optional features. In this example, the computing device includes an anomaly database builder to generate at least one entry for the anomaly database. Optionally, to generate the at least one entry for the anomaly database comprises to perform a simulation to iterate through workloads on the IoT system at gateway architecture characteristics of the IoT system giving resulting solution characteristics of the IoT system. Optionally, to generate the at least one entry for the anomaly database comprises to add a solution characteristic of the IoT system as an anomaly to the anomaly database in response to the solution characteristic and associated gateway characteristic of the IoT system indicating an anomaly for a given workload on the IoT system. Optionally, to generate the at least one entry for the anomaly database comprises to generate the at least one entry offline via a simulation of the IoT system and not in the real-time operation of the IoT system.

Example 15 includes the computing device of any one of examples 12 to 14, including or excluding optional features. In this example, the computing device comprises the anomaly database.

Example 16 includes the computing device of any one of examples 12 to 15, including or excluding optional features. In this example, the computing device comprises an aggregation device of the IoT system. Optionally, the IoT system comprises IoT sensors wirelessly coupled to the aggregation device, and wherein the IoT sensors comprise at least one simulated IoT sensor.

Example 17 is a computing device for an Internet of Things (IoT) system, the computing device to: perform profiling and diagnostics of the IoT system, comprising to: match an observed solution characteristic of the IoT system to an anomaly in an anomaly database; and issue a notification in response to the match; and implement corrective action in response to the notification.

Example 18 includes the computing device of example 17, including or excluding optional features. In this example, the computing device comprises an aggregation device of the IoT system. Optionally, the IoT system comprises IoT sensors wirelessly coupled to the aggregation device. Optionally, the IoT sensors comprises a simulated IoT sensor.

Example 19 includes the computing device of any one of examples 17 to 18, including or excluding optional features. In this example, the IoT system comprises sensors wirelessly coupled to the computing device.

Example 20 includes the computing device of any one of examples 17 to 19, including or excluding optional features. In this example, the IoT system comprises a simulated IoT sensor.

Example 21 includes the computing device of any one of examples 17 to 20, including or excluding optional features. In this example, the computing device to match the observed solution characteristic to the anomaly in the anomaly database comprises real-time monitoring by the computing device of the IoT system.

Example 22 includes the computing device of any one of examples 17 to 21, including or excluding optional features. In this example, the system includes a processor and memory storing code executable by the processor to perform the profiling and diagnostics.

Example 23 includes the system of any one of examples 17 to 22, including or excluding optional features. In this example, the computing device includes a processor and memory storing code executable by the processor to: match the observed solution characteristic to the anomaly; and issue the notification in response to the match.

Example 24 includes the computing device of any one of examples 17 to 23, including or excluding optional features. In this example, the corrective action to prevent a failure in the IoT system associated with the anomaly.

Example 25 includes the computing device of any one of examples 17 to 24, including or excluding optional features. In this example, the computing device to perform profiling and diagnostics comprises the computing device to generate the anomaly database for the IoT system. Optionally, the computing device to generate the anomaly database comprises to perform a simulation to iterate through workloads on the IoT system at gateway architecture characteristics of the IoT system giving resulting solution characteristics of the IoT system. Optionally, to generate the anomaly database comprises to add a solution characteristic of the IoT system as an anomaly to the anomaly database in response to the solution characteristic indicating an anomaly for a given workload on the IoT system.

Example 26 includes the computing device of any one of examples 17 to 25, including or excluding optional features. In this example, the observed solution characteristic is based on the IoT system comprising a hybrid of live components and a simulated component.

Example 27 is a computing device for an Internet of Things (IoT) system, the computing device including a processor; and memory storing code executable by the processor to: perform profiling and diagnostics of the IoT system, comprising to: generate an anomaly database; perform real-time monitoring of the IoT system to match an observed solution characteristic of the IoT system to an anomaly in the anomaly database; and issue a notification in response to the match; and implement corrective action in response to the notification.

Example 28 includes the computing device of example 27, including or excluding optional features. In this example, the computing device comprises an aggregation device of the IoT system. Optionally, the IoT system comprises sensors wirelessly coupled to the aggregation device.

Example 29 includes the computing device of any one of examples 27 to 28, including or excluding optional features. In this example, the corrective action to prevent a failure in the IoT system associated with the anomaly.

Example 30 includes the computing device of any one of examples 27 to 29, including or excluding optional features. In this example, to generate the anomaly database comprises to perform a simulation to iterate through workloads on the IoT system at gateway architecture characteristics of the IoT system giving resulting solution characteristics of the IoT system. Optionally, to generate the anomaly database comprises to add to the anomaly database the solution characteristics that indicate an anomaly.

Example 31 is a method, by a computing device, for an Internet of Things (IoT) system. The method includes: generating an anomaly database for the IoT system; matching an observed solution characteristic of the IoT system to an anomaly in the anomaly database; and issuing a notification in response to the match; and implementing corrective action in response to the notification.

Example 32 includes the method of example 31, including or excluding optional features. In this example, the method includes preventing, via the corrective action, a failure in the IoT system associated with the anomaly.

Example 33 includes the method of any one of examples 31 to 32, including or excluding optional features. In this example, the computing device comprises an aggregation device of the IoT system, and wherein the IoT system comprises sensors coupled to the aggregation device.

Example 34 includes the method of any one of examples 31 to 33, including or excluding optional features. In this example, generating the anomaly database comprises performing a simulation comprising iterating through workloads on the IoT system at characteristics of a gateway architecture of the IoT system giving resulting solution characteristics of the IoT system. Optionally, generating the anomaly database comprises adding a solution characteristic of the IoT system as an anomaly to the anomaly database in response to the solution characteristic and associated gateway characteristic of the IoT system indicating an anomaly for a given workload on the IoT system. Optionally, the gateway architecture comprises a hybrid of live and emulated components of the IoT system.

Example 35 is a tangible, non-transitory, computer-readable medium comprising code executable by a processor of a computing device to direct the processor to match an observed solution characteristic of the IoT system to an anomaly in an anomaly database.

Example 36 includes the computer-readable medium of example 35, including or excluding optional features. In this example, the code executable by the processor to direct the processor to issue a notification in response to the match. Optionally, the code executable by the processor to direct the processor to facilitate implementing corrective action in response to the notification. Optionally, the corrective action to prevent a failure in the IoT system associated with the anomaly.

Example 37 includes the computer-readable medium of any one of examples 35 to 36, including or excluding optional features. In this example, the code executable by the processor to direct the processor to generate the anomaly database. Optionally, to generate the anomaly database comprises to perform a simulation of the IoT system to iterate through workloads on the IoT system at gateway architecture characteristics of the IoT system giving resulting solution characteristics of the IoT system. Optionally, to generate the anomaly database comprises to add a solution characteristic of the IoT system as an anomaly to the anomaly database in response to the solution characteristic and associated gateway architecture characteristic of the IoT system indicating an anomaly for a given workload on the IoT system. Optionally, the gateway architecture characteristics are associated with a gateway architecture comprising a hybrid of live and simulated components of the IoT system.

Example 38 includes the computer-readable medium of any one of examples 35 to 37, including or excluding optional features. In this example, the computing device comprises an aggregation device of the IoT system the aggregation device coupled to IoT sensors in the IoT system. Optionally, the IoT sensors comprise an emulated IoT sensor.

Example 39 is a computing device for an Internet of Things (IoT) system including: means for performing profiling and diagnostics of the IoT system, comprising: means for matching an observed solution characteristic of the IoT system to an anomaly in an anomaly database; and means for issuing a notification in response to the match.

Example 40 includes the computing device of example 39, including or excluding optional features. In this example, the computing device includes means for implementing corrective action in response to the notification. Optionally, the system includes means, via the corrective action, a failure in the IoT system associated with the anomaly.

Example 41 includes the computing device of any one of examples 39 to 40, including or excluding optional features. In this example, the observed solution characteristic is based on the IoT system comprising a hybrid of live and simulated components.

Example 42 includes the computing device of any one of examples 39 to 41, including or excluding optional features. In this example, the computing device comprises an aggregation device of the IoT system, and wherein the IoT system comprises IoT sensors coupled to the aggregation device.

Example 43 includes the computing device of any one of examples 39 to 42, including or excluding optional features. In this example, the means for performing profiling and diagnostics comprises means for generating the anomaly database. Optionally, the means for generating the anomaly database comprises means for performing a simulation to iterate through workloads on the IoT system at characteristics of a gateway architecture of the IoT system giving resulting simulated solution characteristics of the IoT system. Optionally, the means for generating the anomaly database comprises adding a simulated solution characteristic of the IoT system as an anomaly to the anomaly database in response to the simulated solution characteristic and associated gateway characteristic of the IoT system indicating an anomaly for a given workload on the IoT system. Optionally, the gateway architecture comprises a hybrid of live and emulated components of the IoT system.

Example 44 is a computing device for an Internet of Things (IoT) system, the computing device including: an anomaly database builder to generate an anomaly database for the IoT system; and an anomaly matcher to match an observed solution characteristic of the IoT system to an anomaly in the anomaly database.

Example 45 includes the computing device of example 44, including or excluding optional features. In this example, the anomaly matcher to match in real-time operation of the IoT system the observed solution characteristic to the anomaly in the anomaly database.

Example 46 includes the computing device of any one of examples 44 to 45, including or excluding optional features. In this example, the computing device includes a notification issuer to issue a notification in response to the match. Optionally, the computing device includes a corrective action implementer to facilitate implementing corrective action in response to the notification. Optionally, the corrective action to prevent a failure in the IoT system associated with the anomaly.

Example 47 includes the computing device of any one of examples 44 to 46, including or excluding optional features. In this example, to generate the anomaly database comprises to perform a simulation to iterate through workloads on the IoT system at gateway architecture characteristics of the IoT system giving resulting solution characteristics of the IoT system. Optionally, to generate the anomaly database comprises to add a simulated solution characteristic of the IoT system as an anomaly to the anomaly database.

Example 48 includes the computing device of any one of examples 44 to 47, including or excluding optional features. In this example, to generate the anomaly database comprises to generate the anomaly database offline via a simulation of the IoT system and not in the real-time operation of the IoT system.

Example 49 includes the computing device of any one of examples 44 to 48, including or excluding optional features. In this example, the computing device comprises the anomaly database.

Example 50 includes the computing device of any one of examples 44 to 49, including or excluding optional features. In this example, the computing device comprises an aggregation device of the IoT system. Optionally, the IoT system comprises IoT sensors wirelessly coupled to the aggregation device. Optionally, the IoT sensors comprise at least one simulated IoT sensor.

It is to be understood that specifics in the aforementioned examples may be used anywhere in one or more embodiments. For instance, all optional features of the computing device described above may also be implemented with respect to either of the methods described herein or a computer-readable medium. Furthermore, although flow diagrams or state diagrams may have been used herein to describe embodiments, the present techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A computing device for an Internet of Things (IoT) systems, the computing device comprising:
   a processor; and
   storage comprising instructions that, when executed by the processor, direct the processor to:
   match an observed solution characteristic of the IoT system to an anomaly; and
   prevent, via a corrective action, a failure in the IoT system associated with the anomaly, wherein the observed solution characteristic is based on the IoT system comprising a hybrid of live and simulated components.

2. The computing device of claim 1, wherein the computing device comprises an aggregation device of the IoT system, wherein the IoT system comprises sensors wirelessly coupled to the aggregation device, and wherein to match the observed solution characteristic to the anomaly comprises real-time monitoring by the computing device of the IoT system.

3. The computing device of claim 1, wherein the instructions, when executed by the processor, direct the processor to:
predict that the IoT system is trending toward the anomaly; and
prevent, via the corrective action, the failure in the IoT system based on the trending prediction.

4. The computing device of claim 1, wherein the anomaly comprises one or more of a deterioration of the IoT system, an operation overload of the IoT system, a condition where observed features or characteristics of the IoT system are outside normal parameters, or a condition where the IoT system may be rendered unusable or incapable of performing desired tasks.

5. The computing device of claim 1, wherein the anomaly is an anomaly stored in an anomaly database.

6. The computing device of claim 1, the storage comprising instructions that, when executed by the processor, direct the processor to perform profiling and diagnostics of the IoT system.

7. The computing device of claim 6, wherein to perform profiling and diagnostics of the IoT system comprises to generate at least one entry for an anomaly database for the IoT system, and to match the observed solution characteristic of the IoT system to the anomaly includes to match the observed solution characteristic to at least one entry in the anomaly database.

8. The computing device of claim 7, wherein to generate the at least one entry for the anomaly database comprises to perform a simulation to iterate through workloads on the IoT system at different gateway architecture characteristics of the IoT system giving resulting solution characteristics of the IoT system.

9. The computing device of claim 8, wherein to generate the at least one entry for the anomaly database comprises to add a simulated solution characteristic of the IoT system as an anomaly to the anomaly database in response to the simulated solution characteristic indicating an anomaly for a given workload on the IoT system.

10. A method, by a computing device, for an Internet of Things (IoT) system, comprising:
matching an observed solution characteristic of the IoT system to an anomaly; and
preventing, via a corrective action, a failure in the IoT system associated with the anomaly, wherein the observed solution characteristic is based on the IoT system comprising a hybrid of live and simulated components.

11. The method of claim 10, wherein the computing device comprises an aggregation device of the IoT system, and wherein the IoT system comprises sensors coupled to the aggregation device.

12. The method of claim 10, comprising:
predicting that the IoT system is trending toward the anomaly; and
preventing, via the corrective action, the failure in the IoT system based on the predicting.

13. The method of claim 10, wherein the anomaly comprises one or more of a deterioration of the IoT system, an operation overload of the IoT system, a condition where observed features or characteristics of the IoT system are outside normal parameters, or a condition where the IoT system may be rendered unusable or incapable of performing desired tasks.

14. The method of claim 10, wherein the anomaly is an anomaly stored in an anomaly database.

15. The method of claim 14, comprising generating at least one entry for the anomaly database.

16. The method of claim 15, comprising performing a simulation iterating through workloads on the IoT system giving resulting simulated solution characteristics of the IoT system.

17. The method of claim 16, wherein iterating through workloads comprises iterating through workloads at different gateway architecture characteristics of the IoT system, wherein a gateway architecture comprises the hybrid of live and simulated components of the IoT system, and wherein generating the at least one entry for the anomaly database comprises adding a simulated solution characteristic of the IoT system as an anomaly to the anomaly database in response to the simulated solution characteristic and associated gateway characteristic of the IoT system indicating an anomaly for a given workload on the IoT system.

18. A tangible, non-transitory, computer-readable medium for an Internet of Things (IoT) system, the computer-readable medium comprising code executable by a processor of a computing device to direct the processor to:
match an observed solution characteristic of the IoT system to an anomaly; and
prevent, via a corrective action, a failure in the IoT system associated with the anomaly, wherein the observed solution characteristic is based on the IoT system comprising a hybrid of live and simulated components.

19. The tangible, non-transitory, computer-readable medium of claim 18, comprising code executable by the processor to:
predict that the IoT system is trending toward the anomaly; and
prevent, via the corrective action, the failure in the IoT system based on the trending prediction.

20. The tangible, non-transitory, computer-readable medium of claim 18, wherein the anomaly comprises one or more of a deterioration of the IoT system, an operation overload of the IoT system, a condition where observed features or characteristics of the IoT system are outside normal parameters, or a condition where the IoT system may be rendered unusable or incapable of performing desired tasks.

21. The tangible, non-transitory, computer-readable medium of claim 18, comprising code executable by the processor to:
generate at least one entry for an anomaly database for the IoT system; and
perform a simulation to iterate through workloads on the IoT system at different gateway architecture characteristics of the IoT system giving resulting simulated solution characteristics of the IoT system, wherein the at least one entry comprises a simulated solution characteristic.

22. The tangible, non-transitory, computer-readable medium of claim 21, wherein the gateway architecture characteristics are associated with a gateway architecture comprising the hybrid of live and simulated components of the IoT system.

23. The tangible, non-transitory, computer-readable medium of claim 22, wherein to generate the at least one entry for the anomaly database comprises to add the simulated solution characteristic of the IoT system as an anomaly to the anomaly database in response to the simulated solution characteristic and associated gateway architecture characteristic of the IoT system indicating an anomaly for a given workload on the IoT system.

24. A computing device for an Internet of Things (IoT) system, the computing device comprising:
means for matching an observed solution characteristic of the IoT system to an anomaly; and
means for preventing, via a corrective action, a failure in the IoT system associated with the anomaly, wherein the observed solution characteristic is based on the IoT system comprising a hybrid of live and simulated components.

25. The computing device of claim 24, comprising:
means for predicting that the IoT system is trending toward the anomaly; and
means for preventing, via the corrective action, the failure in the IoT system based on the trending prediction.

26. The computing device of claim 24, wherein the anomaly comprises one or more of a deterioration of the IoT system, an operation overload of the IoT system, a condition where observed features or characteristics of the IoT system are outside normal parameters, or a condition where the IoT system may be rendered unusable or incapable of performing desired tasks.

27. The computing device of claim 24, wherein the means for matching includes means for matching the observed solution characteristic to the anomaly in real-time operation of the IoT system.

28. The computing device of claim 24, comprising means for building an anomaly database to generate at least one entry, wherein the anomaly database includes the anomaly.

29. The computing device of claim 28, comprising means for generating the at least one entry for the anomaly database by performing a simulation to iterate through workloads on the IoT system at gateway architecture characteristics of the IoT system giving resulting solution characteristics of the IoT system.

30. The computing device of claim 29, comprising means for generating the at least one entry for the anomaly database by adding a solution characteristic of the IoT system as an anomaly to the anomaly database in response to the solution characteristic and associated gateway characteristic of the IoT system indicating an anomaly for a given workload on the IoT system.

31. The computing device of claim 28, comprising means for generating the at least one entry for the anomaly database by generating the at least one entry offline via a simulation of the IoT system and not in the real-time operation of the IoT system.

32. The computing device of claim 28, wherein the computing device comprises the anomaly database.

33. The computing device of claim 24, wherein the computing device comprises an aggregation device of the IoT system.

34. The computing device of claim 33, wherein the IoT system comprises IoT sensors wirelessly coupled to the aggregation device, and wherein the IoT sensors comprise at least one simulated IoT sensor.

* * * * *